(12) United States Patent
Setchell et al.

(10) Patent No.: US 11,030,640 B2
(45) Date of Patent: Jun. 8, 2021

(54) PROVIDING HANDS-FREE DATA FOR INTERACTIONS

(71) Applicant: GOOGLE LLC, Mountain View, CA (US)

(72) Inventors: William Setchell, Sunnyvale, CA (US); Mallinath Bareddy, Cupertino, CA (US); Phillip Ellsworth Stahlfeld, Mountain View, CA (US); Yichen Zhao, Sunnyvale, CA (US); Xiaoyong Chai, Sunnyvale, CA (US); Timothy Raymond Zwiebel, San Jose, CA (US); Michal Palczewski, San Jose, CA (US); Chunxiao Diao, Mountain View, CA (US); Dennis Yung-Chi Hu, Redwood City, CA (US); Anuj Batra, Redwood City, CA (US); Min-Hao Wu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 15/915,050

(22) Filed: Mar. 7, 2018

(65) Prior Publication Data

US 2018/0349939 A1   Dec. 6, 2018

Related U.S. Application Data

(60) Provisional application No. 62/513,076, filed on May 31, 2017.

(51) Int. Cl.
*G06Q 30/00* (2012.01)
*G06Q 30/02* (2012.01)
(Continued)

(52) U.S. Cl.
CPC ....... *G06Q 30/0226* (2013.01); *G06F 21/316* (2013.01); *G06F 21/32* (2013.01);
(Continued)

(58) Field of Classification Search
None
See application file for complete search history.

(56) References Cited

U.S. PATENT DOCUMENTS

| 6,522,772 B1 | 2/2003 | Morrison et al. |
| 8,254,647 B1 | 8/2012 | Nechyba et al. |

(Continued)

FOREIGN PATENT DOCUMENTS

| AU | 2017101062 A4 | 8/2017 |
| EP | 2 963 615 A1 | 1/2016 |

(Continued)

OTHER PUBLICATIONS

Lander, "United Kingdom Office Action received for United Kingdom Patent Application No. 1715687.8", dated Aug. 17, 2018, 6 pages.

(Continued)

*Primary Examiner* — Michael W Schmucker
(74) *Attorney, Agent, or Firm* — Dority & Manning, P.A.

(57) ABSTRACT

A user verification system is configured to identify likely interactors approaching points of interaction to ensure accurate interactions and to provide loyalty rewards. In an example, a interaction system installs a user verification device with a stereo camera at an interacting device to capture images of the user and to obtain data from the device. The user verification device uses the stereo camera to determine the location of the user to determine if the user is a likely interactor. The user verification device recognizes motions of the user that are indicative of an interactor, such as reaching across the counter or looking at the operator. The user verification device identifies or verifies the interactor based on the record data or the display data. If the user is the (Continued)

likely interactor, then the system conducts a hands-free interaction with the user account or provides loyalty rewards to the user account.

19 Claims, 15 Drawing Sheets

(51) Int. Cl.
| | |
|---|---|
| *G06N 20/00* | (2019.01) |
| *G06Q 20/20* | (2012.01) |
| *G06K 9/00* | (2006.01) |
| *G06Q 20/40* | (2012.01) |
| *G06F 21/32* | (2013.01) |
| *H04W 12/08* | (2021.01) |
| *H04L 29/06* | (2006.01) |
| *G06F 21/31* | (2013.01) |
| *H04W 12/06* | (2021.01) |
| *H04N 13/204* | (2018.01) |
| *H04L 29/08* | (2006.01) |

(52) U.S. Cl.
CPC ..... *G06K 9/00288* (2013.01); *G06K 9/00335* (2013.01); *G06K 9/00771* (2013.01); *G06N 20/00* (2019.01); *G06Q 20/20* (2013.01); *G06Q 20/40145* (2013.01); *H04L 63/0861* (2013.01); *H04N 13/204* (2018.05); *H04W 12/06* (2013.01); *H04W 12/08* (2013.01); *G06F 2221/2111* (2013.01); *G06T 2207/10021* (2013.01); *H04L 67/306* (2013.01)

(56) References Cited

U.S. PATENT DOCUMENTS

| | | | |
|---|---|---|---|
| 8,577,810 B1 | 11/2013 | Dalit et al. | |
| 9,202,245 B2 | 12/2015 | Kostka et al. | |
| 9,229,623 B1 | 1/2016 | Penilla et al. | |
| 9,619,803 B2 | 4/2017 | Chandrasekaran et al. | |
| 9,747,587 B2 | 8/2017 | Diehl | |
| 9,770,206 B2 | 9/2017 | Ashokan | |
| 9,881,303 B2 | 1/2018 | Vohra et al. | |
| 9,972,004 B1 | 5/2018 | Donavalli et al. | |
| 9,998,863 B2 | 6/2018 | Mycek et al. | |
| 2003/0046237 A1 | 3/2003 | Uberti | |
| 2005/0055582 A1 | 3/2005 | Bazakos et al. | |
| 2005/0165667 A1 | 7/2005 | Cox | |
| 2006/0160525 A1 | 7/2006 | Watanabe | |
| 2009/0005987 A1 | 1/2009 | Vengroff et al. | |
| 2009/0313129 A1 | 12/2009 | Rothschild | |
| 2010/0211966 A1 | 8/2010 | Zhang et al. | |
| 2011/0170739 A1 | 7/2011 | Gillam et al. | |
| 2011/0178883 A1 | 7/2011 | Granbery et al. | |
| 2011/0190055 A1 | 8/2011 | Leyvand et al. | |
| 2011/0238510 A1 | 9/2011 | Rowen et al. | |
| 2011/0257985 A1 | 10/2011 | Goldstein | |
| 2011/0307403 A1 | 12/2011 | Rostampour et al. | |
| 2012/0310736 A1 | 12/2012 | Vengroff et al. | |
| 2013/0035979 A1 | 2/2013 | Tenbrock | |
| 2013/0159119 A1 | 6/2013 | Henderson et al. | |
| 2013/0182114 A1* | 7/2013 | Zhang | H04N 7/18 348/150 |
| 2013/0223696 A1 | 8/2013 | Azar et al. | |
| 2013/0251216 A1 | 9/2013 | Smowton et al. | |
| 2014/0052554 A1* | 2/2014 | Abraham | G07G 1/14 705/21 |
| 2014/0067649 A1 | 3/2014 | Kannan et al. | |
| 2014/0165187 A1 | 6/2014 | Daesung et al. | |
| 2014/0222596 A1 | 8/2014 | S | |
| 2014/0289833 A1 | 9/2014 | Briceno et al. | |
| 2014/0289834 A1 | 9/2014 | Lindemann | |
| 2014/0325373 A1* | 10/2014 | Kramer | G06F 3/0425 715/740 |
| 2014/0372128 A1 | 12/2014 | Sheets et al. | |
| 2015/0003673 A1* | 1/2015 | Fletcher | G06K 9/00335 382/103 |
| 2015/0046990 A1 | 2/2015 | Oberheide et al. | |
| 2015/0066671 A1 | 3/2015 | Nichols et al. | |
| 2015/0072618 A1 | 3/2015 | Granbery | |
| 2015/0073907 A1 | 3/2015 | Purves et al. | |
| 2015/0073980 A1 | 3/2015 | Griffin et al. | |
| 2015/0079942 A1 | 3/2015 | Kostka et al. | |
| 2015/0120473 A1 | 4/2015 | Jung et al. | |
| 2015/0154588 A1* | 6/2015 | Purves | G06Q 30/0641 705/14.27 |
| 2015/0161417 A1 | 6/2015 | Kaplan et al. | |
| 2015/0261787 A1 | 9/2015 | Hu et al. | |
| 2015/0309569 A1 | 10/2015 | Kohlhoff et al. | |
| 2015/0332258 A1 | 11/2015 | Kurabi et al. | |
| 2015/0356563 A1* | 12/2015 | Vohra | G06Q 20/3224 705/44 |
| 2016/0014406 A1 | 1/2016 | Takahashi et al. | |
| 2016/0027073 A1 | 1/2016 | Eramian | |
| 2016/0042346 A1 | 2/2016 | Pastore et al. | |
| 2016/0062473 A1* | 3/2016 | Bouchat | G06F 3/0304 345/156 |
| 2016/0063496 A1 | 3/2016 | Royyuru et al. | |
| 2016/0072915 A1 | 3/2016 | Deccane | |
| 2016/0180150 A1 | 6/2016 | Negi et al. | |
| 2016/0253656 A1 | 9/2016 | Dragushan et al. | |
| 2016/0321633 A1 | 11/2016 | Chandrasekaran et al. | |
| 2016/0321671 A1 | 11/2016 | Chandrasekaran et al. | |
| 2016/0323274 A1 | 11/2016 | Chandrasekaran et al. | |
| 2017/0004507 A1 | 1/2017 | Henderson et al. | |
| 2017/0083281 A1* | 3/2017 | Shin | G10L 13/00 |
| 2017/0164159 A1 | 6/2017 | Mycek et al. | |
| 2017/0193480 A1 | 7/2017 | Chandrasekaran et al. | |
| 2018/0114219 A1 | 4/2018 | Setchell et al. | |
| 2018/0225714 A1* | 8/2018 | Lewis | H04W 4/021 |
| 2018/0255433 A1 | 9/2018 | Mycek et al. | |
| 2019/0364039 A1 | 11/2019 | Chandrasekaran et al. | |

FOREIGN PATENT DOCUMENTS

| | | |
|---|---|---|
| GB | 2368951 A | 5/2002 |
| GB | 2513173 A | 10/2014 |
| WO | 2016/176517 A1 | 11/2016 |
| WO | 2016/176517 A8 | 11/2016 |
| WO | 2017/004602 A1 | 1/2017 |
| WO | 2018075227 A1 | 4/2018 |
| WO | 2018/222232 A1 | 12/2018 |

OTHER PUBLICATIONS

Danzig "U.S. Office Action issued in copending U.S. Appl. No. 15/143,451, filed Apr. 29, 2016", dated Oct. 16, 2019, 22 pages.
Wittmann-Regis "International Preliminary Report on Patentability issued in International Application No. PCT/US2017/054621", dated May 2, 2019, 7 pages.
Masud "U.S. Office Action issued in copending U.S. Appl. No. 15/462,772, filed Mar. 17, 2017", dated Apr. 16, 2019, 10 pages.
Crawley, "U.S. Office Action issued in copending U.S. Appl. No. 14/791,239, filed Jul. 2, 2015", dated May 16, 2018, 29 pages.
Thielemann "European Office Action issued in European Application No. 16738639.0", dated Aug. 9, 2019, 4 pages.
Lander "United Kingdom Office Action received for United Kingdom Patent Application No. 1715687.8", dated Oct. 21, 2019, 2 pages.
Choi "U.S. Office Action issued in copending U.S. Appl. No. 15/299,444, filed Oct. 20, 2016", dated Aug. 5, 2019, 18 pages.
Crawley, "U.S. Office Action issued in copending U.S. Appl. No. 14/791,239, filed Jul. 2, 2015", dated Oct. 3, 2019, 21 pages.
Crawley, "U.S. Office Action issued in copending U.S. Appl. No. 14/791,239, filed Jul. 2, 2015", dated Sep. 18, 2018, 25 pages.
McCoy "U.S. Office Action issued in copending U.S. Appl. No. 15/143,453, filed Apr. 29, 2016", dated Oct. 29, 2018, 18 pages.
Lander, "United Kingdom Office Action received for United Kingdom Patent Application No. 1715687.8", dated May 25, 2018, 8 pages.

(56) References Cited

OTHER PUBLICATIONS

McCoy, "U.S. Office Action issued in copending U.S. Appl. No. 15/143,453, filed Apr. 29, 2016", dated Jun. 29, 2018, 16 pages.
Sinsky "Square Introduces Hands-free Payments", CNET, Nov. 2, 2011, 4 pages.
Choi, "U.S. Office Action issued in copending U.S. Appl. No. 15/299,444, filed Oct. 20, 2016", dated Mar. 5, 2019, 14 pages.
Lander, "United Kingdom Office Action received for United Kingdom Patent Application No. 1715687.8", dated Jan. 10, 2019, 14 pages.
Berthon, "International Search Report and Written Opinion issued in International Application No. PCT/US2018/018443", dated Apr. 20, 2018, 14 pages.
Berthon, "International Search Report and Written Opinion issued in International Application No. PCT/US2016/029898", dated Jul. 22, 2016, 12 pages.
Crawley, "U.S. Office Action issued in copending U.S. Appl. No. 14/791,239, filed Jul. 2, 2015", dated Oct. 5, 2016, 18 pages.
Crawley, "U.S. Office Action issued in copending U.S. Appl. No. 14/791,239, filed Jul. 2, 2015", dated May 24, 2017, 29 pages.
Crawley, "U.S. Office Action issued in copending U.S. Appl. No. 14/791,239, filed Jul. 2, 2015", dated Oct. 13, 2017, 30 pages.
Keoh-Lehmann, "International Search Report and Written Opinion issued in International Application No. PCT/US2016/040881", dated Aug. 26, 2016, 14 pages.
Lander, "United Kingdom Office Action received for United Kingdom Patent Application No. 1715687.8", dated Jan. 16, 2018, 5 pages.
Lander, "United Kingdom Office Action received for United Kingdom Patent Application No. 1715687.8", dated Oct. 31, 2017, 7 pages.
McCoy, "U.S. Office Action issued in copending U.S. Appl. No. 15/143,453, filed Apr. 29, 2016", dated Nov. 27, 2017, 11 pages.
Ullah Masud, "U.S. Office Action issued in copending U.S. Appl. No. 14/701,517, filed Apr. 30, 2015", dated Jun. 15, 2016, 11 pages.
Van Der Weiden, "International Search Report and Written Opinion issued in International Application No. PCT/US2017/054621", dated Nov. 29, 2017, 13 pages.
Moon, "International Preliminary Report on Patentability issued in International Application No. PCT/US2016/029898", dated Nov. 9, 2017, 9 pages.
Nickitas-Etienne, "International Preliminary Report on Patentability issued in International Application No. PCT/US2016/040881", dated Jan. 11, 2018, 10 pages.
U.S. Appl. No. 16/534,701 to Sashikanth Chandrasekaran et al. filed Aug. 7, 2019.
Crawley, "U.S. Office Action issued in co-pending U.S. Appl. No. 14/791,239, filed Jul. 2, 2015", dated Jun. 11, 2019, 22 pages.
Danzig "U.S. Office Action issued in copending U.S. Appl. No. 15/143,451, filed Apr. 29, 2016", dated Apr. 1, 2019, 15 pages.
"German Office Action issued in German Application No. 11-2016-001971.8", dated Mar. 27, 2019, 7 pages of German Office Action only.
U.S. Appl. No. 14/701,517 to Chandrasekaran et al. filed Apr. 30, 2015.
U.S. Appl. No. 14/791,239 to Henderson et al. filed Jul. 2, 2015.
U.S. Appl. No. 15/143,451 to Chandrasekaran. et al. filed Apr. 29, 2016.
U.S. Appl. No. 15/143,453 to Chandrasekaran et al. filed Apr. 29, 2016.
U.S. Appl. No. 15/299,444 to Setchell et al. filed Oct. 20, 2016.
U.S. Appl. No. 15/462,772 to Chandrasekaran et al. filed Mar. 17, 2017.

\* cited by examiner

240

Receiving, by a point of sale device, a facial template and a payment token for each user in range of merchant beacon device

710

Account management system extracts facial template associated with user account identifier

720

Account management system generates payment token for user account and notifies issuer system of association of payment token with user payment account

730

Account management system identifies point of sale device associated with merchant beacon device identifier

740

Account management system transmits facial template of identified user and generated payment token to point of sale device

750

Merchant point of sale device receives facial template of user and payment token

760

Merchant point of sale device adds facial template of user to current customer log

770

Merchant point of sale device periodically updates current customer log

PROVIDING HANDS-FREE DATA FOR INTERACTIONS

CROSS-REFERENCE TO RELATED APPLICATION

This patent application claims priority to U.S. Provisional Patent Application No. 62/513,076, filed May 31, 2017, and entitled "Providing Hands-Free Loyalty Rewards." The entire contents of the above-identified application are hereby fully incorporated herein by reference.

TECHNICAL FIELD

The present disclosure relates to improving user interaction experiences by employing user image analysis, interaction timing data, and record data to select and identify a likely interaction initiator.

BACKGROUND

When users make conventional interactions at physical locations, many methods of conducting the interactions are available. Users may use many different cards or accounts for interactions. The user account identifiers and other data represented by the cards may be communicated to the physical system via magnetic stripes, near field communication technologies involving user computing devices, and other suitable mechanisms.

Current applications for conducting interactions at a physical location may provide an opportunity for the user to verify a hands-free interaction via biometric information of a user, such as image recognition of a user at checkout. Systems may provide loyalty rewards to a user if the provides loyalty information to the physical location at the time of purchase, such as by presenting a loyalty rewards card.

Conventional applications may use facial recognition to identify users. However, current applications may not adequately prevent inaccurate selection of a facial template when multiple users are captured in a camera image. When a facial image of a customer other than the user is selected when the user is attempting an interaction, the wrong account may be accessed, causing problems for the merchant system, the incorrectly accessed user, and the interacting user. All of these systems must perform multiple computer steps and offline steps to correct the interaction. Proper identification of a user account is essential to providing secure, accurate, timely interactions.

Further, current applications that do not provide an accurate identification of an interacting user may cause loyalty data to be attributed to the wrong user.

SUMMARY

Techniques herein provide computer-implemented methods to identify likely interactors approaching points of interaction to ensure accurate interactions and to provide loyalty rewards or other data. In an example, an interaction system installs a user verification device with a stereo camera at a point of interaction to capture images of the user and to obtain data from the interaction device. The user verification device uses the stereo camera to determine the location of the user to determine if the user is a likely interactor, such as a purchase transactor. In another example, the user verification device recognizes motions of the user that are indicative of a transactor, such as reaching across the counter, looking at the salesperson, looking at a menu, or speaking to a salesperson. In another example, the user verification device identifies or verifies the transactor based on the receipt data or the display data. If the user is the likely transactor, then system conducts a hands-free transaction with the user account or provides loyalty rewards to the user account.

In certain other example aspects described herein, systems and computer program products to identify likely interactors approaching points of interactions to ensure accurate interactions and to provide loyalty rewards.

These and other aspects, objects, features, and advantages of the examples will become apparent to those having ordinary skill in the art upon consideration of the following detailed description of illustrated examples.

BRIEF DESCRIPTION OF THE DRAWINGS

FIG. 7 is a block flow diagram depicting a method to receive, by a point of sale device, a facial template and a payment token for each user in range of a merchant beacon device, in accordance with certain examples.

DETAILED DESCRIPTION OF EXAMPLES

Overview

Figure 1:
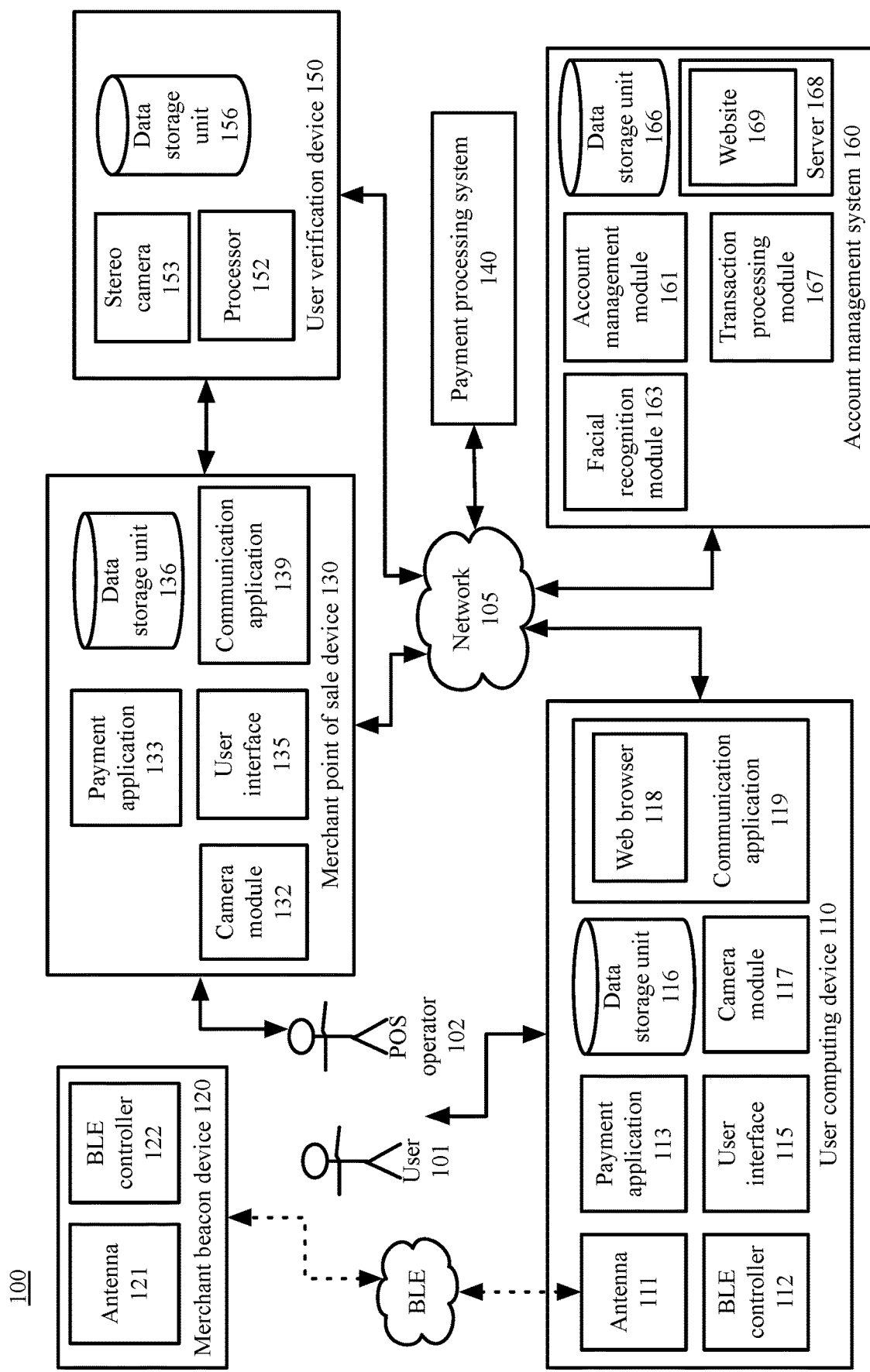
FIG. 1 is a block diagram depicting a system to process hands-free transactions with facial recognition of a user, in accordance with certain examples.

The examples described herein provide computer-implemented techniques to improve usage and user hands-free interaction experiences by using user image analysis, transaction timing data, and receipt data to select and identify a likely interaction initiator.

In an example, a user verification device is installed proximate to the point of sale ("POS") device. The user verification device is configured to emulate a barcode scanner or other device that provides input into the POS device. The user verification device is configured to emulate a printer, monitor, or other device that receives outputs from the POS device. The user verification device includes a camera, such as a stereo camera. A stereo camera uses multiple camera devices to obtain images from different perspectives.

In an example, the interaction at a physical location is a transaction, such as a financial transaction at a merchant system location. A merchant system registers with an account management system. The merchant system installs one or more merchant beacon devices and one or more merchant point of sale devices at a merchant system location. A user establishes an account with the account management system and downloads a payment application on a user computing device associated with the user. In an example, the user transmits an image of himself and/or an audio recording of himself to the account management system to establish a facial template and/or audio template associated with the user account. The user enters a merchant system location and signs into the payment application via the user computing device. The user computing device receives a merchant beacon device identifier broadcasted at the merchant location from the merchant beacon device and transmits the merchant beacon device identifier to the account management system. The account management system transmits facial templates, audio templates, and/or challenges and responses to the merchant point of sale device associated with users whose user computing devices are in network range of the merchant beacon device and who are signed in to the payment application.

Additionally, the account management system generates a payment token for each user whose user computing device is in network range of the merchant beacon device and who is signed in to the payment application. An example payment token comprises a series of alphanumeric and/or symbolic characters. The example payment token may be associated with a payment account of the user and be recognizable by an issuer system associated with the payment account of the user. For example, the account management system generates the payment token and communicates the payment token to an issuer system associated with a payment account of the user along with the user payment account information. In this example, if the issuer system, at a later time, receives the payment token from a point of sale device in a payment transaction, the issuer system is able to extract the user payment account information associated with the payment token. In certain examples, the payment account information is associated with a loyalty account instead of a financial account. The issuer system pays for the product with loyalty points instead of a credit card, debit card, bank account, or other financial account.

In certain examples, the user verification device associated with the merchant point of sale device captures a facial image of the user and then identifies the user based on a comparison of the captured facial image and the received facial templates. The comparison may occur at any other suitable computing device or system, such as a module on the account management system. In certain instances, the user verification device may capture more than one face in the image, video, or series of images. For example, if a line is formed at the point of sale device, the image of the person in the front of the line may be captured, but also the person standing second in line may be captured.

The user verification device, point of sale device, the merchant system, the account management system, or any other suitable system may analyze the image to determine which person in the image is likely the person at the front of the line to conduct a transaction. Throughout the specification, the user verification device will represent any computing system that analyzes the image. The person that is likely to be attempting to perform a transaction is referred to herein as a transactor or a transacting user.

In one example, the user verification device uses the differing perspectives of the stereo camera to triangulate the location of the one or more users to determine which user is the likely transacting user. For example, if two camera modules of the stereo camera obtain different perspectives of the user, the user verification device may digitize the images, generate a three-dimensional model of the images, and triangulate the location of the user. Any other suitable digital processing of the images may be utilized to triangulate the position of the user. If the user is in a likely position that a transactor would be located, then the user is determined to be the transactor. In an example, a transactor would be a user that is directly before the POS device and at the sales counter. A person that is farther back or positioned to the side would not be a likely transactor.

In certain examples, the triangulation process is improved if the user verification device has used facial recognition to identify the user. That is, when the user has been identified, the user verification device may use the parameters of the facial recognition to improve the three-dimensional model of the space before the POS device. When multiple cameras of the stereo camera are attuned to the face of the user, then the remaining portion of the image may be ignored, making the triangulation more efficient and accurate.

After identifying the user, the merchant point of sale device processes a transaction using the payment token associated with the user received from the account management system. The merchant point of sale device generates a transaction authorization request comprising the payment token and transaction details and transmits the transaction authorization request to an issuer system associated with the user account selected for use in the transaction. The issuer system identifies the user payment account based on the received payment token and processes the transaction using the transaction details and the user payment account information. The merchant point of sale device receives an approval of the transaction authorization request and transmits a receipt to the merchant point of sale device.

In certain examples, the transaction is a loyalty account transaction. When the merchant identifies the user and the user account, the transaction is processed by debiting the user account a certain number of points, rewards, offers, or any other loyalty currency.

In the following examples, the merchant may not have positively identified the user to conduct a hands-free transaction. For example, if the user paid cash and the user account has not been identified, then the account management system (or any other suitable system) may not have the opportunity to provide loyalty points, rewards, offers, or any other benefits to the user account.

The user verification device uses the stereo camera to determine the location of the user as described above to determine if the user is a likely transactor. In another example, the user verification device recognizes motions of the user that are indicative of a transactor, such as reaching across the counter, looking at the salesperson, looking at a menu, or speaking to a salesperson.

In another example, the user verification device identifies the transactor based on the receipt data or the display data. For example, the user verification device intercepts the receipt data that is being communicated to the receipt printer, performs optical character recognition on the data, and parses the extracted data. The user verification device may compare data on the receipt to known data about the user in the image, such as the last four digits of the credit card number on the receipt, initials of the user on the receipt, or the card type used in the transaction. If the data matches, then the identity of the user as the transactor is determined to be more likely.

The user verification device may use one or more of these indicators to determine that an identified user is the transacting user. When the user is identified, the details of the transaction are applied to a loyalty account of the user. For example, the amount of the transaction is logged in the loyalty account and the appropriate rewards points are applied to the account.

By using and relying on the methods and systems described herein, the account management system, the merchant beacon device, the user computing device, and the merchant point of sale device enable the user to conduct a transaction with the merchant system and/or receive loyalty benefits without the user being forced to interact with the user computing device or produce identity documents or physical payment cards, as required in some current technologies. By using facial analysis and stereo cameras to determine the position of the user, the methods and systems described herein allow the hands-free transactions to be conducted and loyalty points to be applied securely with minimal likelihood of the wrong user being charged for a transaction or provided with loyalty benefits. As such, the systems and methods described herein may reduce erroneous transactions or other interactions that must be corrected by chargebacks, additional transaction processing, and unnecessary communications and computer processing. Further, loyalty benefits will not be provided to erroneous accounts resulting in burdensome computing operations and user efforts to correct the loyalty account balances.

Example System Architecture

Turning now to the drawings, in which like numerals indicate like (but not necessarily identical) elements throughout the figures, examples are described in detail.

FIG. 1 is a block diagram depicting a system 100 for conducting a hands-free transaction with facial recognition of a user 101, in accordance with certain examples. As depicted in FIG. 1, the system 100 includes network computing devices 110, 130, 140, 150, and 160 that are configured to communicate with one another via one or more networks 120. In some embodiments, a user associated with a device must install an application and/or make a feature selection to obtain the benefits of the techniques described herein.

In examples, the network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, 140, 150, and 160 includes a device having a communication module capable of transmitting and receiving data over the network 105. For example, each network computing device 110, 130, 140, 150, and 160 can include a server, desktop computer, laptop computer, tablet computer, a television with one or more processors embedded therein and / or coupled thereto, smart phone, handheld computer, personal digital assistant ("PDA"), or any other wired or wireless, processor-driven device. In the example depicted in FIG. 1, the network computing devices 110, 130, 140, 150, and 160 are operated by users 101, merchant beacon device 120 operators, merchant point of sale ("POS") device 130 operators, payment processing system 140 operators, user verification device 150 operators, and account management system 160, respectively.

An example user computing device 110 comprises an antenna 111, a Bluetooth Low Energy ("BLE") controller 112, a payment application 113, a user interface 115, a data storage unit 116, a camera module 117, a web browser 118, and a communication application 119.

In an example, the antenna 111 is a means of communication between the user computing device 110, a merchant beacon device 120, or other wireless devices. In an example, a BLE controller 112 outputs through the antenna 111 a radio signal, or listens for radio signals from the merchant beacon device 120. In another example a Bluetooth controller, Wi-Fi controller, or a near field communication ("NFC") controller is used. In an example, the BLE controller 112 outputs through the antenna 111 a radio signal, or listens for radio signals from the merchant beacon device 120.

In an example, the BLE controller 112 is capable of sending and receiving data, performing authentication and ciphering functions, and directing how the user computing device 110 will listen for transmissions from the merchant beacon device 120 or configuring the user computing device 110 into various power-save modes according to BLE-specified procedures. In another example, the user computing device 110 comprises a Bluetooth controller, Wi-Fi controller or an NFC controller capable of performing similar functions. An example BLE controller 112 communicates with the payment application 113 and is capable of sending and receiving data over a wireless, BLE communication channel. In another example, a Bluetooth controller 112, Wi-Fi controller 112, or NFC controller 112 performs similar functions as the BLE controller 112 using Bluetooth, Wi-Fi, or NFC protocols. In an example, the BLE controller 112 activates the antenna 111 to create a wireless communication channel between the user computing device 110 and the merchant beacon device 120. The user computing device 110 communicates with the merchant beacon device 120 via the antenna 111. In an example, when the user computing device 110 has been activated, the BLE controller 112 polls through the antenna 111 a radio signal, or listens for radio signals from the merchant beacon device 120.

In an example, the payment application 113 is a program, function, routine, applet, or similar entity that exists on and performs its operations on the user computing device 110. In certain examples, the user 101 must install the payment application 113 and/or make a feature selection on the user computing device 110 to obtain the benefits of the techniques described herein. In an example, the user 101 may access payment application 113 on the user computing device 110 via the user interface 115. In an example, the payment application 113 may be associated with the account management system 160. In another example, the payment application 113 may be associated with a merchant system associated with the merchant beacon device 120 and/or the merchant point of sale device 130.

In an example, the user interface 115 enables the user 101 to interact with the payment application 113, web browser 118, or any other suitable functions on the user computing device 110. For example, the user interface 115 may be a touch screen, a voice-based interface, or any other interface that allows the user 101 to provide input and receive output from an application or module on the user computing device 110. In an example, the user 101 interacts via the user interface 115 with the payment application 113 and/or web browser 118 to configure user 101 accounts with the account management system 160. In another example, the user 101 interacts via the user interface 115 with the payment application 113 and/or the web browser 118 to enable hands-free payments, if needed.

In an example, the data storage unit 116 comprises a local or remote data storage structure accessible to the user computing device 110 suitable for storing information. In an example, the data storage unit 116 stores encrypted information, such as HTML5 local storage.

In an example, the camera module 117 may be any module or function of the user computing device 110 that captures a digital image. The camera module 117 may be resident on the user computing device 110 or in any manner logically connected to the user computing device 110. For example, the camera module 117 may be connected to the user computing device 110 via the network 105. The camera module 117 may be capable of obtaining individual images or a video scan. Any other suitable image capturing device may be represented by the camera module 117.

In an example, the user 101 can use a communication application 119, such as a web browser 118 application or a stand-alone application, to view, download, upload, or otherwise access documents or web pages via a distributed network 105.

In an example, the web browser 118 can enable the user 101 to interact with web pages using the user computing device 110. In an example, the user 101 may access the user's 101 account maintained by the account management system 160 via the web browser 118. In another example, the user 101 may access a merchant system website or an account management system website 169 via the web browser 118. In certain examples described herein, one or more functions performed by the payment application 113 may also be performed by a web browser 118 application associated with the account management system 160.

In an example, the communication application 119 can interact with web servers or other computing devices connected to the network 105, including a web server of a merchant system and a web server 168 of the account management system 160.

In certain examples, one or more functions herein described as performed by the payment application 113 may also be performed by a web browser 118 application, for example, a web browser 118 application associated with a merchant system website or associated with the account management system 160. In certain examples, one or more functions herein described as performed by the payment application 113 may also be performed by the user computing device 110 operating system. In certain examples, one or more functions herein described as performed via the web browser 118 may also be performed via the payment application 113.

An example merchant beacon device 120 comprises an antenna 121 and a Bluetooth Low Energy ("BLE") controller 122. In an example, a merchant system location comprises one or more merchant beacon devices 120 installed at the merchant system location. In certain examples, the hardware and functions of the merchant beacon device 120 are encompassed and performed by the merchant POS device 130 or another merchant system device. In certain examples, the merchant beacon device 120 is a stand-alone device that is logically connected or in communication with the merchant POS device 130 or another merchant system device.

In an example, each installed merchant beacon device 120 is associated by an account management system 160 with a particular merchant point of sale device 130 installed at the merchant location. For example, the account management system 160 may comprise a database that correlates merchant beacon device 120 identifiers with merchant POS device 130 identifiers for associated merchant POS devices 130. For example, a merchant POS device 130 identifier may comprise hardware identifier specific to the device such as a serial number or a media access control ("MAC") identifier. In another example, a merchant beacon device 120 identifier may comprise a hardware identifier specific to the beacon device or an identifier generated by the account management system 160 and stored in the merchant beacon device 120. An example merchant beacon device 120 is programmed to broadcast, emit, or otherwise transmit a particular merchant beacon device 120 identifier over a local wireless network, for example, a BLE network, to any user computing devices 110 within a threshold distance required to maintain the wireless network 105. For example, the wireless network may comprise a BLE network 105, a Wi-Fi network 105, a Bluetooth network 105, an NFC network 105, or any other appropriate wireless network 105.

In an example, the antenna 121 is a means of communication between the user computing device 110 and a merchant beacon device 120. In an example, a BLE controller 122 outputs through the antenna 121 a radio signal, or listens for radio signals from the user computing device 110. In another example a Bluetooth controller, Wi-Fi controller, or a near field communication ("NFC") controller is used. In an example, the BLE controller 122 outputs through the antenna 121 a radio signal, or listens for radio signals from the user computing device 110.

In an example, the BLE controller 122 is capable of sending and receiving data, performing authentication and ciphering functions, and directing how merchant beacon device 120 will listen for transmissions from the user computing device 110 or configuring the merchant beacon device 120 into various power-save modes according to BLE-specified procedures. In another example, the merchant beacon device 120 comprises a Bluetooth controller, Wi-Fi controller or an NFC controller capable of performing similar functions. An example BLE controller 122 communicates with the payment application 113 and is capable of sending and receiving data over a wireless, BLE communication channel. In another example, a Bluetooth controller 122, a Wi-Fi controller 122, or an NFC controller 122 performs similar functions as the Wi-Fi controller 122 using Bluetooth, Wi-Fi, or NFC protocols. In an example, the BLE controller 122 activates the antenna 121 to create a wireless communication channel between the user computing device 110 and the merchant beacon device 120. The merchant beacon device 120 communicates with the user computing device 110 via the antenna 121. In an example, when the merchant beacon device 120 has been activated, the BLE controller 122 polls through the antenna 121 a radio signal, or listens for radio signals from the user computing device 110.

An example merchant point of sale device 130 comprises a camera module 132, a payment application 133, a user interface 135, a data storage unit 136, and a communication application 139.

In an example, the functions of the camera module 132 may be performed by the stereo camera 153 of the user verification device 150. The camera module 132 may alternatively be any module or function of the merchant POS device 130 that captures an image or video input of an external environment of the merchant POS device 130. The camera module may be resident on the merchant POS device 130 or in any manner logically connected to the merchant POS device 130. For example, the audio module 131 may be connected to the merchant POS device 130 via the network 105. The camera module 132 may be capable of capturing one or more images or recording a video recording. Any suitable image capturing and/or video recording device may be represented by the camera module 132.

In an example, the payment application 133 is a program, function, routine, applet, or similar entity that exists on and performs its operations on the merchant point of sale device 130. In certain examples, the merchant POS device operator 102 or other merchant system operator must install the payment application 133 and/or make a feature selection on the merchant point of sale device 130 to obtain the benefits of the techniques described herein. In an example, the merchant POS device operator 102 may access the payment application 133 on the merchant POS device 130 via the user interface 135 of the merchant point of sale device 130. In an example, the payment application 133 may be associated with the account management system 160. In another example, the payment application 133 may be associated with a merchant system associated with the merchant beacon device 120 and the merchant camera device 140.

In an example, the user interface 135 enables the merchant POS device operator 102 to interact with the merchant POS device 130. For example, the user interface 135 may be a touch screen, a voice-based interface, or any other interface that allows the merchant POS device operator 102 to provide input and receive output from an application or module on the merchant POS device 130. In an example, the merchant POS device operator 102 interacts via the user interface 135 with the payment application 133.

In an example, the data storage unit 136 comprises a local or remote data storage structure accessible to the merchant POS device 130 suitable for storing information. In an example, the data storage unit 136 stores encrypted information, such as HTML5 local storage.

In an example, the communication application 139, such as a web browser application or a stand-alone application, enables an operator of the merchant POS device 130 to view, download, upload, or otherwise access documents or web pages via a distributed network 105. For example, the communication application 139 may enable communication over the network 105 with the account management system 160, a payment processing system 140, and/or an issuer system 150.

An example payment processing system 140 communicates with the account management system 160 and the merchant point of sale device 130. In an example, when the account management system 160 processes a payment transaction, the account management system 160 transmits user 101 payment account data to the payment processing system 140, which communicates a transaction authorization request an issuer system (not pictured) associated with the payment account data on behalf of the merchant system. In this example, the payment processing system 140 receives an approval or a denial of the payment authorization request from the issuer system 140. In this example, the payment processing system 140 communicates a notification to the account management system 160 and/or the merchant point of sale device 130 of an approved or denied transaction. In this example, the account management system 160 and/or the merchant point of sale device 130 that receives the notification of an approved or denied transaction may transmit receipt data to the user computing device 110. The payment processing system 140 may represent any other card network system that includes an acquirer or other card network system components. The payment processing system 140 may also serve the functions of an issuer system (not shown) if the payment processing system 140 issued the payment instrument used by the user 101.

An example user verification device 150 may include a stereo camera 153, a processor 152, and data storage unit 156. The user verification device 150 may be configured to perform functions to employ user image analysis, transaction timing data, and receipt data to select and identify a likely transaction initiator. The user verification device 150 is logically connected, either wirelessly or via cables such as a USB cable, to the POS device 130. The user verification device 150 is configured to use the location of a user, the timing of a transaction, and the transaction data to verify the identity of a user 101 to verify a transaction or to provide loyalty benefits.

The stereo camera 153 may be any camera module employing multiple lenses and/or image processors. The stereo camera 153 captures an image from two or more angles to provide three-dimensional images, such as to simulate binocular vision. The stereo camera 153 may be used to provide images that allow the user verification device 150 to triangulate the position of a user 101. In certain examples, certain features of the user verification device 150 may be performed with only a single lensed camera while other features require a three-dimensional view. For example, monitoring certain of the motions of the user 101 may be performed without a stereo camera.

The user verification device 150 comprises a processor 152 that is used to process the images, perform facial recognition, triangulate user positions, interpret user motions, perform optical character recognition functions, communicate with the POS device 130 or other devices, and perform any other processing functions required by the user verification device 150. In an example, the data storage unit 156 comprises a local or remote data storage structure accessible to the user verification device 150 suitable for storing information. In an example, the data storage unit 156 stores encrypted information, such as HTML5 local storage.

An example account management system 160 comprises an account management module 161, a facial recognition module 163, a data storage unit 166, a transaction processing module 167, a server 168, and a website 169.

In an example, the account management module 161 manages one or more user 101 accounts. In an example, a user 101 account may comprise a digital wallet account, an email account, a social networking account, or any other appropriate account associated with the account management system 160. In an example, the account management system 161 communicates with a payment application 113 operating on a user computing device 110 associated with a user 101 having a user 101 account with the account management system 160. In an example, the user 101 enters payment account information into the user account via the payment application 113 and the account management module 161 receives the payment account information over the network 105 and associates the received payment account information with the user account.

In an example, the data storage unit 166 comprises a local or remote data storage structure accessible to the account management system 160 suitable for storing information. In an example, the data storage unit 166 stores encrypted information, such as HTML5 local storage.

In certain examples, the transaction processing module 167 receives transaction details from a merchant POS device 130 and a request to initiate a transaction. Example transaction details comprise merchant system account information, a total amount of the transaction, and a user 101 selection of a user payment account associated with the user's 101 account with the account management system 160. For example, the user's 101 account is a digital wallet account comprising one or more payment account information corresponding to one or more respective payment accounts of the user 101. In an example, the transaction processing module 167 extracts payment account information from the user 101 account corresponding to the user 101 selection of the user 101 payment account received in the transaction details from the merchant POS device 130. In an example, the transaction processing module 167 transmits a payment authorization request to an issuer system 150 or other appropriate financial institution associated with the payment account selected by the user 101 for use in the transaction. An example payment authorization request may comprise merchant system payment account information, user 101 payment account information, and a total amount of the transaction. In an example, after an issuer system processes the payment authorization request, the transaction processing module 167 receives an approval or denial of the payment authorization request from the issuer system over the network 105. In an example, the transaction processing module 167 transmits a receipt to the merchant POS device 130 and/or the user computing device 110 comprising a summary of the transaction.

In certain examples, the functions of the account management system 160 may be performed by the payment processing system 140. For example, the payment processing system 140 may also be the system that manages the payment account and/or the facial recognition functions for the user 101 and/or the merchant system.

It will be appreciated that the network connections shown are example and other means of establishing a communications link between the computers and devices can be used. Moreover, those having ordinary skill in the art having the benefit of the present disclosure will appreciate that the user computing device 110, the merchant beacon device 120, the merchant point of sale device 130, the payment processing system 140, the user verification device 150, and the account management system 160 illustrated in FIG. 1 can have any of several other suitable computer system configurations. For example, a user computing device 110 embodied as a mobile phone or handheld computer may or may not include all the components described above.

Figure 15:
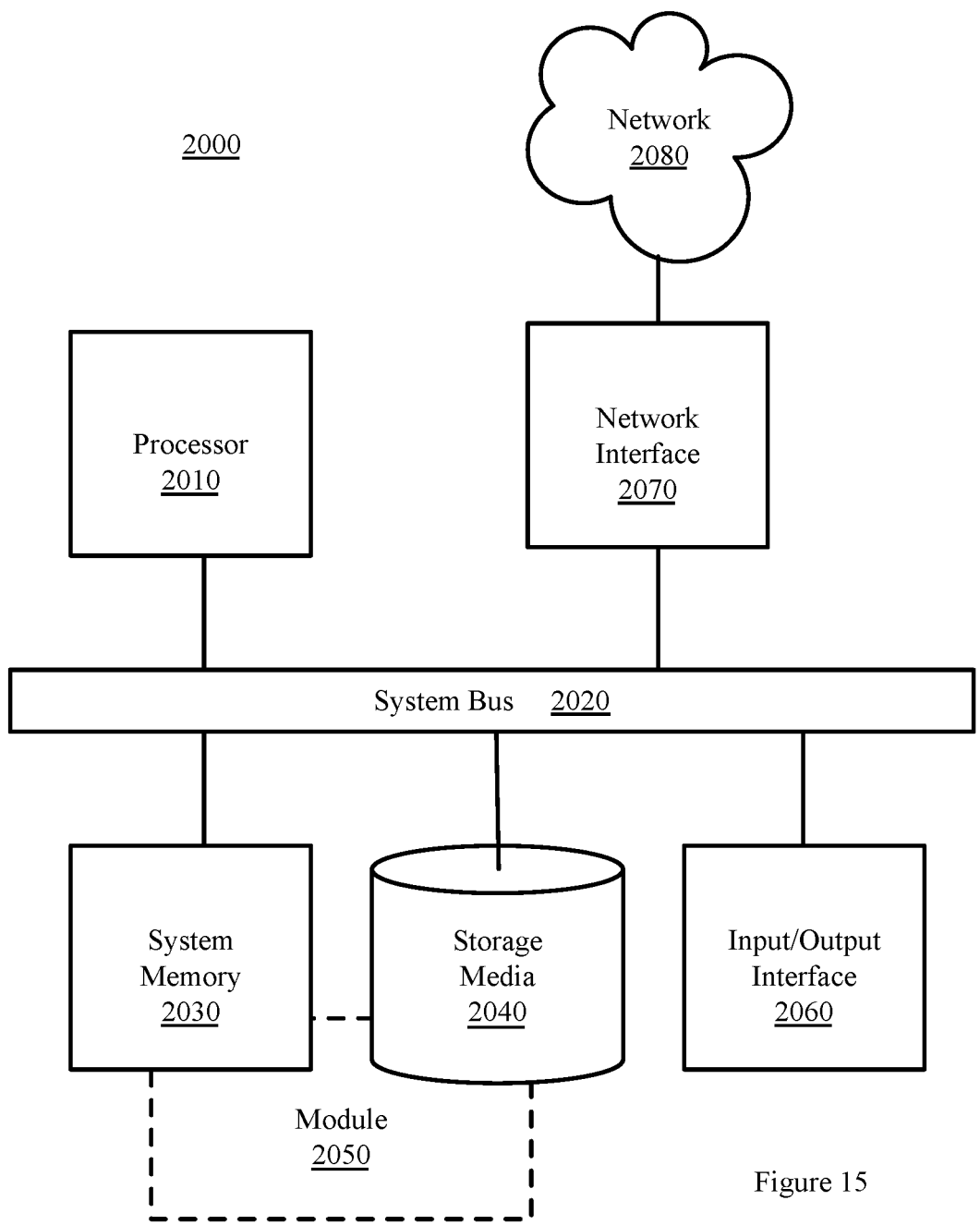
FIG. 15 is a block diagram depicting a computing machine and module, a user via voice recognition, in accordance with certain examples.

In examples, the network computing devices and any other computing machines associated with the technology presented herein may be any type of computing machine such as, but not limited to, those discussed in more detail with respect to FIG. 15. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 15. The computing machines discussed herein may communicate with one another, as well as with other computing machines or communication systems over one or more networks, such as network 105. The network 105 may include any type of data or communications network, including any of the network technology discussed with respect to FIG. 15.

Example Processes

The example methods illustrated in FIGS. 2-14 are described hereinafter with respect to the components of the example operating environment 100. The example methods of FIGS. 2-14 may also be performed with other systems and in other environments.

Figure 2:
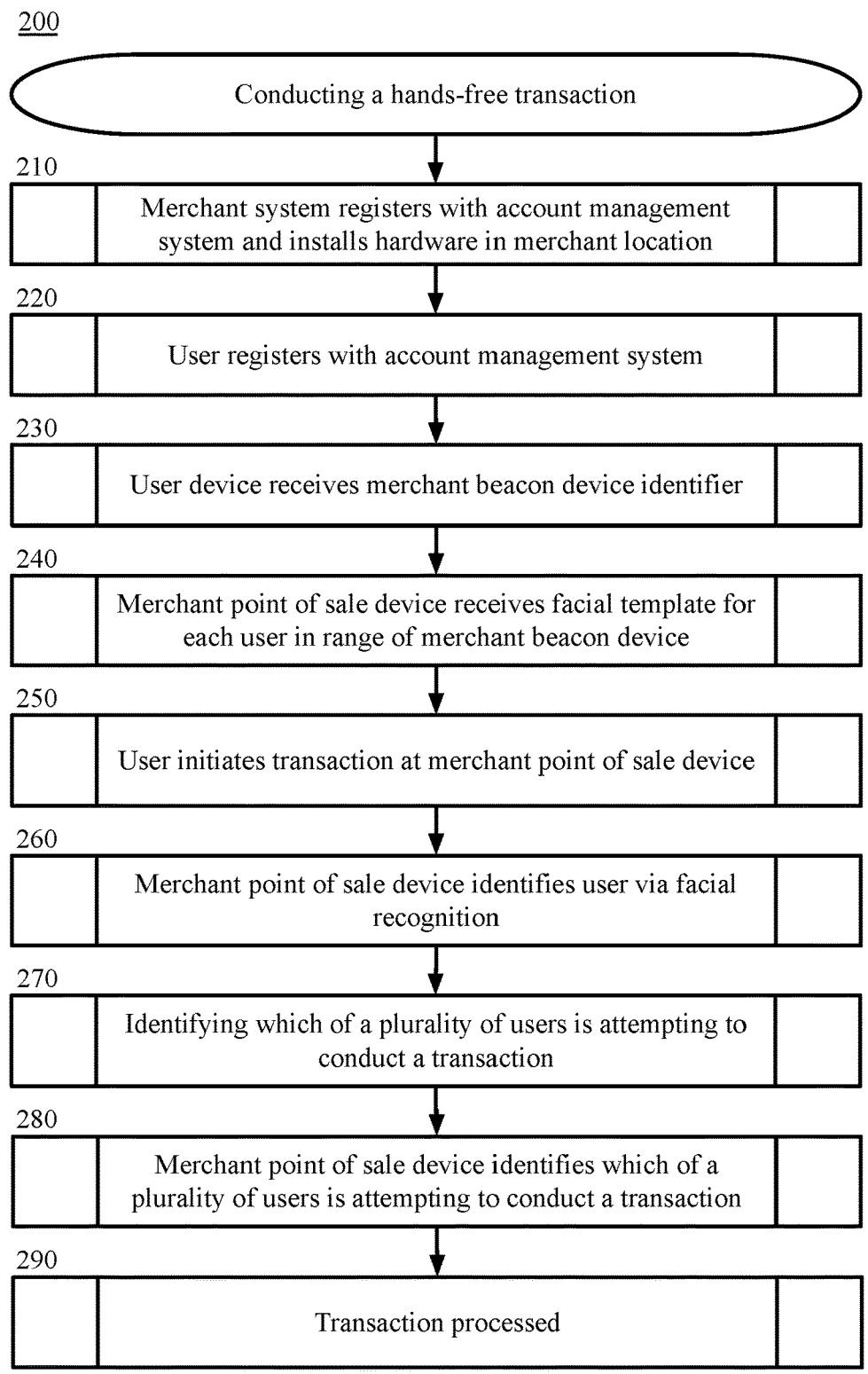
FIG. 2 is a block flow diagram depicting a method to process hands-free transactions with facial recognition of a user, in accordance with certain examples.

FIG. 2 is a block diagram depicting a method 200 for conducting a hands-free transaction with facial recognition of a user 101, in accordance with certain examples. The method 200 is described with reference to the components illustrated in FIG. 1.

In block 210, the merchant system registers with the account management system 160 and installs hardware in a merchant location. The method for registering, by a merchant system, with an account management system 160 and installing hardware at a merchant system location is described in more detail hereinafter with reference to the method described in FIG. 3.

Figure 3:
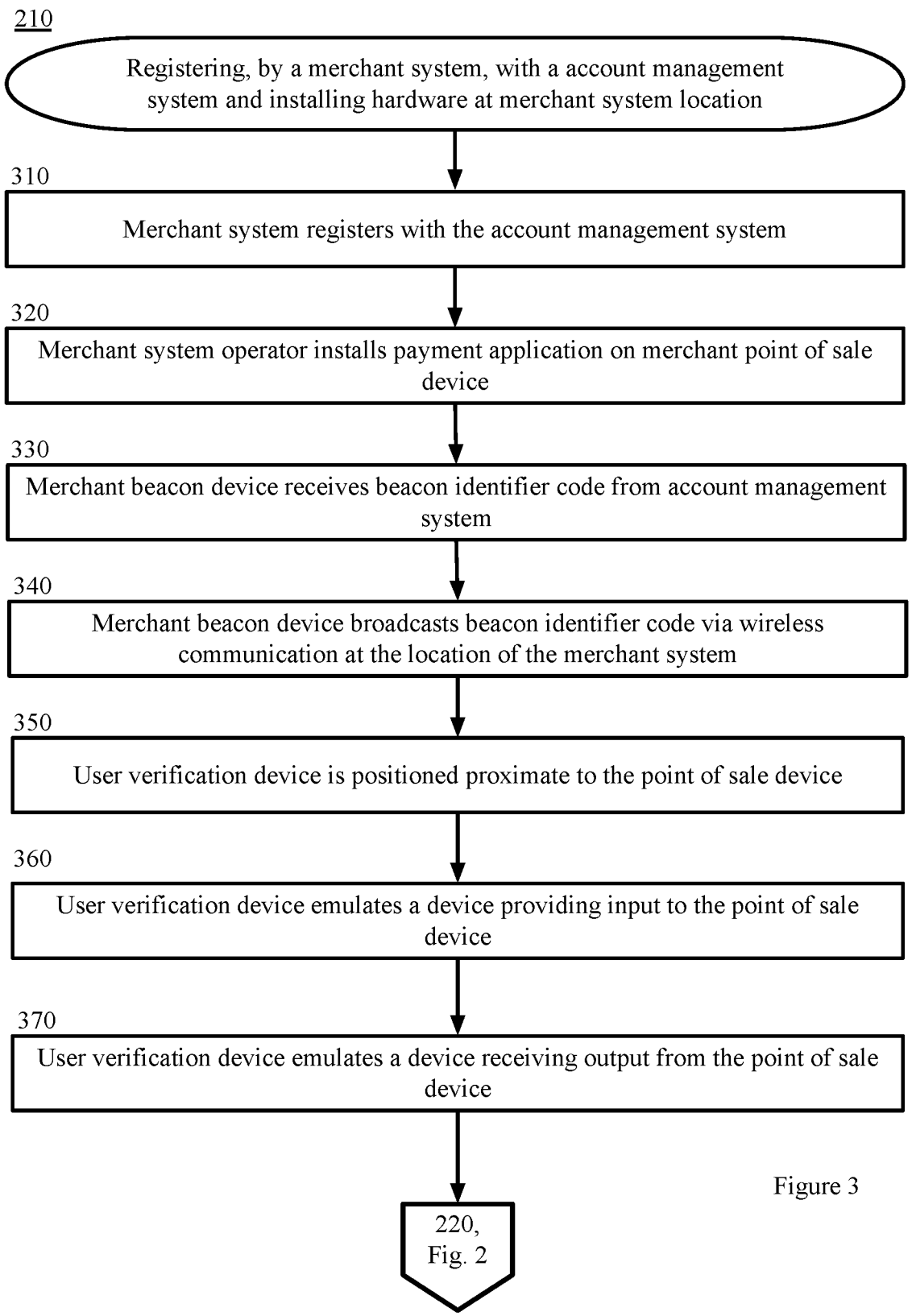
FIG. 3 is a block flow diagram depicting a method to register, by a merchant system, with an account management system and installing hardware at a merchant system location, in accordance with certain examples.

FIG. 3 is a block diagram depicting a method 210 for registering, by a merchant system, with an account management system 160 and installing hardware at a merchant system location, in accordance with certain examples. The method 210 is described with reference to the components illustrated in FIG. 1.

In the examples described herein, the merchant system does not need to install hardware at the example merchant system location in any particular order. The method 210 describes one example method of installing hardware at the merchant location. However, the merchant system or other system installing the merchant hardware does not need to install the merchant POS device 130, the merchant camera device 140, or the merchant beacon device 120 in the order described herein.

In block 310, a merchant system registers with the account management system 160. In an example, an agent of the merchant system accesses an account management system 160 website and registers for a merchant account with the account management system 160 via the website. In an example, the merchant system adds payment account information associated with a merchant account to the merchant account managed by the account management system 160. In an example, the merchant system comprises one or more merchant system locations. For example, the merchant system may comprise one or more physical store locations. An example merchant location comprises one or more merchant point of sale ("POS") devices 130. In an example, one or more merchant POS device operators 102 operate the one or more merchant POS devices 130 at the merchant system location.

In block 320, a merchant system operator installs the payment application 133 on the merchant point of sale device 130. In another example, the merchant system operator purchases a merchant POS device 130 from the account management system 160 with the payment application 133 pre-installed on the merchant POS device 130. In an example, the merchant POS device 130 is able to communicate with the account management system 160 over a network 105. In an example, the merchant POS device 130 communicates with the account management system 160 via the payment application 133. For example, the merchant POS device 130 may be able to transmit transaction details to the account management system 160 via the payment application 133 over the network 105 to enable the account management system 160 to process a transaction. In another example, the merchant POS device 130 may be able to receive a receipt from the account management system 160 that notifies a merchant POS device operator 102 as to whether a transaction was successful or not.

In block 330, the merchant beacon device 120 receives a beacon identifier from the account management system 160. In an example, the merchant system receives a beacon identifier from the account management system 160 and installs or otherwise saves the beacon identifier on the merchant beacon device 120. In an example, a merchant system operator installs the merchant beacon device 120 in proximity to a merchant POS device 130. In an example, the merchant system operator installs a plurality of merchant beacon devices 120, each merchant beacon device 120 in proximity to one or more associated merchant POS devices 130. In an example, the merchant beacon device 120 is able to broadcast a merchant beacon identifier over a wireless medium, wherein one or more user computing devices 110 located within a threshold proximity to the merchant beacon device 120 are able to receive the merchant beacon identifier over the wireless medium. In another example, the merchant beacon device 120 is able to establish a local network 105 connection to one or more user computing devices 110 located within a threshold proximity to the merchant beacon device 120 and the merchant beacon device 120 transmits the merchant beacon identifier to the one or more user computing devices 110 over the established local network 105 connection. For example, the threshold proximity depends on the network 105 communication protocol utilized by the merchant beacon device 120.

In block 340, the merchant beacon device 120 broadcasts the beacon identifier code via wireless communication at the location of the merchant system. For example, the merchant beacon device 120 may broadcast, emit, or otherwise transmit data comprising the beacon identifier via Wi-Fi, Bluetooth, Bluetooth low energy ("BLE"), near field communication ("NFC"), or other appropriate communication protocol to one or more user computing devices 110 located at the merchant system location within a threshold proximity to the merchant beacon device 120. In some examples, the merchant beacon device 120, at a time before transmitting the merchant beacon identifier, is operable to establish a network 105 connection between the merchant beacon device 120 and one or more user computing devices 110 located at the merchant system location within a threshold proximity to the merchant beacon device 120.

In block 350, a user verification device 150 is positioned proximate to the POS device 130. A merchant system operator or another operator installs the user verification device 150 at the merchant system location to correspond to the merchant beacon device 120. In an example, both a user verification device 150 and a merchant beacon device 120 are installed in proximity to a particular merchant POS device 130. In another example, a user verification device 150 and a merchant beacon device 120 are installed in proximity to two or more particular merchant POS devices 130. In another example, the merchant beacon device 120 is positioned at the entrance to the merchant location or in a centrally located position in the merchant location. In this position, the user computing device 110 is able to prepare for a transaction at a time before the user 101 approaches the POS device 130. In certain examples, the user verification device 150 employs the camera module 132 of the POS device 130 in addition to, or in place of, the stereo camera 153 of the user verification device 150.

In an example, the stereo camera 153 of the user verification device 150 is oriented to be able to capture video and/or images of a face of a user 101 standing in front of one or more merchant POS devices 130 during the process of checkout. In an example, the merchant system installs a user verification device 150 that is oriented to capture video and/or images of the face of a user standing in front of a particular merchant POS device 130. In another example, the merchant system installs a user verification device 150 that is oriented to capture video and/or images of the faces of one or more users 101 standing within a proximity of a particular plurality of merchant POS devices 130 within a range of a field of vision of the stereo camera 153 of the user verification device 150.

In another example, multiple stereo cameras 153 are installed at the location of the merchant. For example, one stereo camera 153 may be located at the entrance to capture users 101 as they enter the store, and then a second stereo camera 153 located at the POS device 130 to capture users 101 as they approach the POS device 130 to conduct a transaction.

In block 360, the user verification device 150 emulates a device providing input to the POS device 130. For example, the user verification device 150 emulates a barcode scanner that provides input of data to the POS device 130. The user verification device 150 provides a signal wirelessly or via a USB connection or other wired connection to the POS device 130 to input data to the POS device 130, such as a captured image or a user identification.

In block 370, the user verification device 150 emulates a device receiving an output from the POS device 130. For example, the user verification device 150 emulates a printer or a monitor that receives an output of data from the POS device 130. The user verification device 150 receives a signal wirelessly or via a USB connection or other wired connection from the POS device 130 to receive data from the POS device 130, such as transaction data or receipt data.

In certain examples, one or both of the user verification device 150 and the merchant beacon device 120 are components of the merchant POS device 130 or are wirelessly or physically connected to the merchant POS device 130 and controlled by one or more processors of the merchant POS device 130. In certain examples, certain functions described herein as performed by the user verification device 150 and/or the merchant beacon device 120 may also be performed by the merchant POS device 130. In other examples, all of the components are separate components that are logically connected.

From block 370, the method 210 proceeds to block 220 of FIG. 2.

Returning to FIG. 2, in block 220, the user 101 registers with the account management system 160. The method for registering, by a user 101, for an account with an account management system 160 is described in more detail hereinafter with reference to the method 220 described in FIG. 4.

Figure 4:
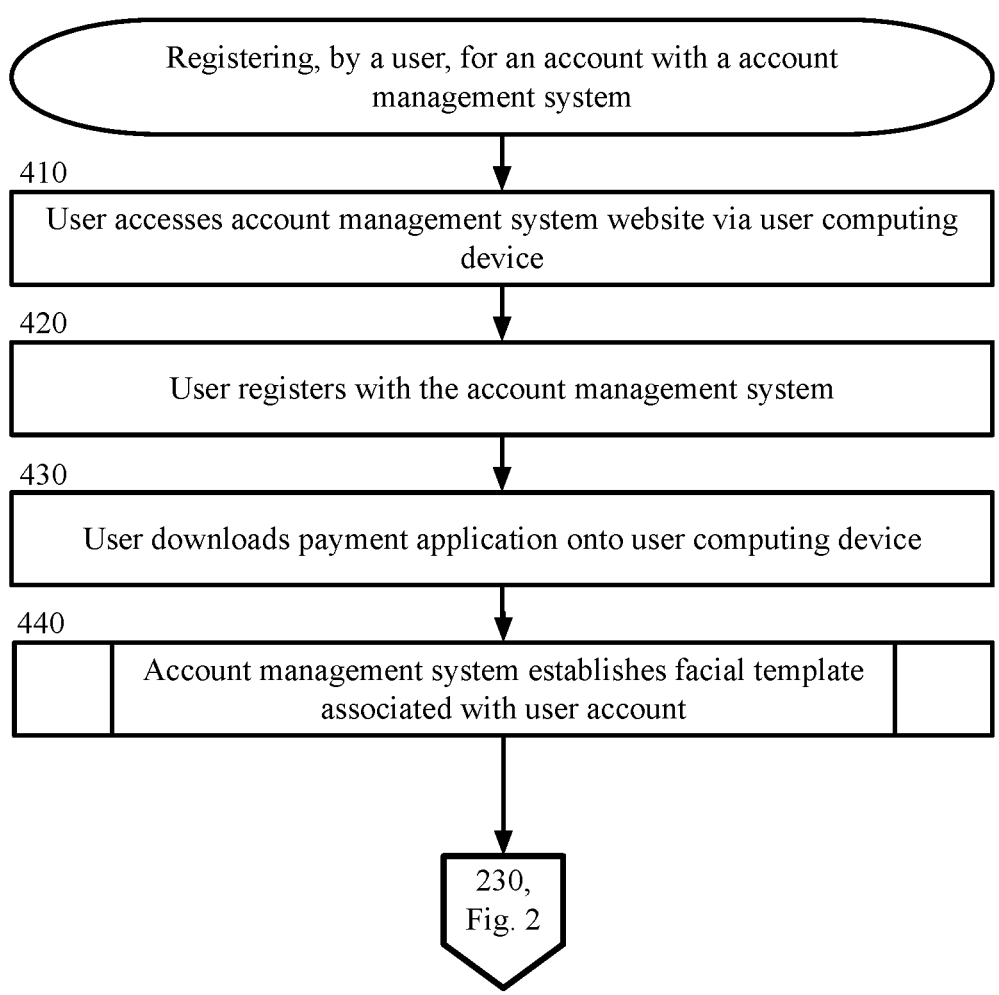
FIG. 4 is a block flow diagram depicting a method to register, by a user, for an account with an account management system, in accordance with certain examples.

FIG. 4 is a block diagram depicting a method 220 for registering, by a user 101, for an account with an account management system 160, in accordance with certain examples. The method 220 is described with reference to the components illustrated in FIG. 1.

In block 410, the user 101 accesses the account management system website 169. For example, the user 101 accesses the account management system 160 via the web browser 118 of the user computing device 110. In another example, the user 101 may otherwise contact the account management system 160 to register for a user 101 account.

In block 420, the user 101 registers with the account management system 160. The user 101 may obtain a user account number, receive the appropriate applications and software to install on the user computing device 110, request authorization to participate in hands-free payment processing, or perform any action required by the account management system 160. The user 101 may utilize the functions of the user computing device 110, such as the user interface 115 and the web browser 118, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the account management system 160.

In block 430, the user 101 downloads the payment application 113 onto the user computing device 110. In an example, the payment application 113 operating on the user computing device 110 is able to communicate with the account management system 160 over the network 105. In an example, the user 101 may configure user 101 account settings or add, delete, or edit payment account information via the payment application 113. In an example, the user 101 may select an option to enable or disable the permission of the account management system 160 to process hands free transactions. For example, a hands free transaction comprises a transaction wherein the user 101 does not need to interact with the user computing device 110 or requires minimal user 101 interaction with the user computing device 110 to initiate a transaction with the merchant system.

In block 440, the account management system 160 establishes a facial template associated with the user 101 account. The method for establishing a facial template associated with a user 101 account is described in more detail hereinafter with reference to the method 440 described in FIG. 5.

Figure 5:
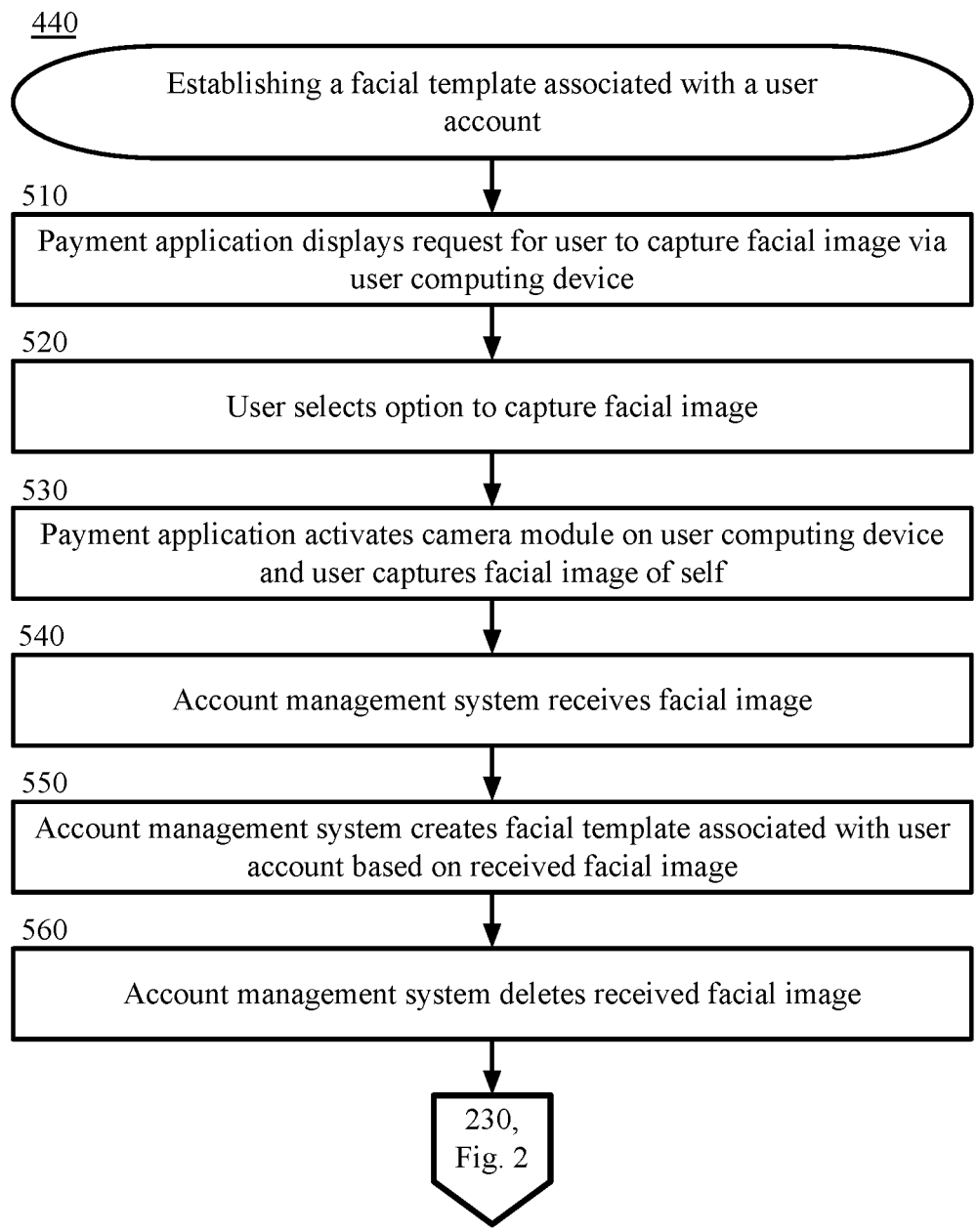
FIG. 5 is a block flow diagram depicting a method to establish a facial template associated with a user account, in accordance with certain examples.

FIG. 5 is a block diagram depicting a method 440 for establishing a facial template associated with a user 101 account, in accordance with certain examples. The method 440 is described with reference to the components illustrated in FIG. 1.

In block 510, the payment application 113 displays a request for the user 101 to capture a facial image via the user computing device 110. In an example, the payment application 113 displays the request via the user interface 115. In an example, the user interface 115 may display a request that reads, "to enable hands free transactions, we need an image of your face. Would you like submit a facial image now?" In this example, the user 101 may select an option to take a current picture or may otherwise select a picture stored on the user computing device 110.

In block 520, the user 101 selects an option to capture a facial image. For example, the user 101 actuates an object on the user interface 115 that reads, "yes, I would like to take a picture now."

In block 530, the payment application 113 activates the camera module 117 on the user computing device 110 and the user 101 captures a facial image. In an example, the user computing device user interface 115 may display a live camera feed of the user 101 to aid the user 101 in aligning the user's 101 face to take the facial image. In an example, the payment application 113 may display on the user computing device 110 a box or other perimeter on the user interface 115 within which the user 101 should align his face to take a picture of a required size predetermined by the account management system 160. In an example, the user 101 may actuate an object on the user interface 115 to capture the image. In this example, in response to the user actuating the object on the user interface 115, the camera module 117 receives a command from the payment application 113 to capture an image of the user 101. In another example, the camera module 117 receives a command from the payment application 113 to capture a plurality of images of the user 101 as the user 101 moves the camera around the user's 101 face. For example, each of the plurality of images of the user 101 may correspond to a particular pose of the user's 101 face. An example facial image may comprise a digital image of the face of a user 101. In an example, the account management system 160 may establish guidelines for users 101 in submitting facial images. For example, the payment application 113 may direct the user 101 to remove any hats, head coverings, glasses, or other objects or accessories that may occlude regions of the user's 101 face so that payment application 160 may receive a complete depiction of the user's 101 face.

In an example, the user computing device 110 determines if the captured facial image is a valid facial image or an invalid facial image. For example, a valid facial image complies with guidelines predetermined by the account management system 160 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In this example, the user 101 captures a subsequent facial image via the user computing device 110, and the user computing device 110 transmits the subsequent facial image to the account management system 160 via the network 105.

In block 540, the account management system 160 receives the facial image. In another example, the account management system 160 receives a plurality of facial images of the user 101. For example, the payment application 113 transmits the one or more facial images of the user 101 to the account management system 160 via the network 105. In an example, the account management system 160 associates the received one or more facial images with the user 101 account. For example, the account management system 160 is able to identify the user 101 account to associate with the received one or more images because the user 101 is currently logged in to the payment application 113 on the user computing device 110 at the time the one or more facial images are transmitted to the account management system 160. In certain examples, the account management system 160 determines if the received facial image is a valid facial image or an invalid facial image. For example, a valid facial image complies with all guidelines predetermined by the account management system 160 and an invalid facial image does not comply with one or more of the guidelines. For example, if a user 101 submits a facial image that comprises incorrect dimensions, if part or all of the user's 101 face is occluded, or if the image is too dark or too bright, the account management system 160 rejects the invalid facial image and transmits a request to the user computing device 110 directing the user 101 to capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 105.

In another example, the user 101 submits a facial image that is not of a face and the account management system 160 or payment application 113 determines, via facial recognition, that the image is not of a face, the account management system 160 or payment application 113 rejects the invalid facial image and transmits a request to the user computing device 110 for display by the user computing device 110 directing the user 101 to capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 105.

In yet another example, the user 101 submits a facial image, but the account management system 160 or payment application 113 determines that the image, based on one or more image metrics such as image resolution, is not of a minimum quality standard, and the account management system 160 or payment application 113 rejects the invalid facial image and transmits a request to the user computing device 110 for display by the user computing device 110 directing the user 101 capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 105.

In block 550, the account management system 160 creates a facial template associated with the user 101 account based on the received facial image. In another example, the account management system 160 generates a corresponding facial template for each of a plurality of received facial images associated with the user 101 account. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network. In an example, the account management system 160 stores the generated facial template associated with the user 101 in a data storage unit 166 associated with the account management system 160. For example, the account management system 160 database may comprise a table or other means by which it correlates each user 101 account identifier with an associated facial template of the user 101.

In another example, after the user computing device 110 captures one or more facial images of the user 101, the user computing device 110 generates one or more facial templates corresponding to one or more of the one or more captured facial images of the user 101. In this example, the user computing device 110 transmits the one or more generated facial templates to the account management system 160 over the network 105.

In block 560, the account management system 160 deletes the received facial image. For example, the account management system 160 only uses a facial template comprising a computer code representation of the facial image of the user 101. In another example, the account management system 160 saves the received facial image for future processing. For example, the account management system 160, at a later time, updates a facial template generation algorithm and generates an updated facial template corresponding to the saved facial image.

From block 560, the method 440 proceeds to block 230 in FIG. 2.

Returning to block 230, in FIG. 2, the user computing device 110 receives a merchant beacon device 120 identifier. The method for receiving, by a user computing device 110, a merchant beacon identifier broadcast by a merchant beacon device 120 is described in more detail hereinafter with reference to the method 230 described in FIG. 6.

Figure 6:
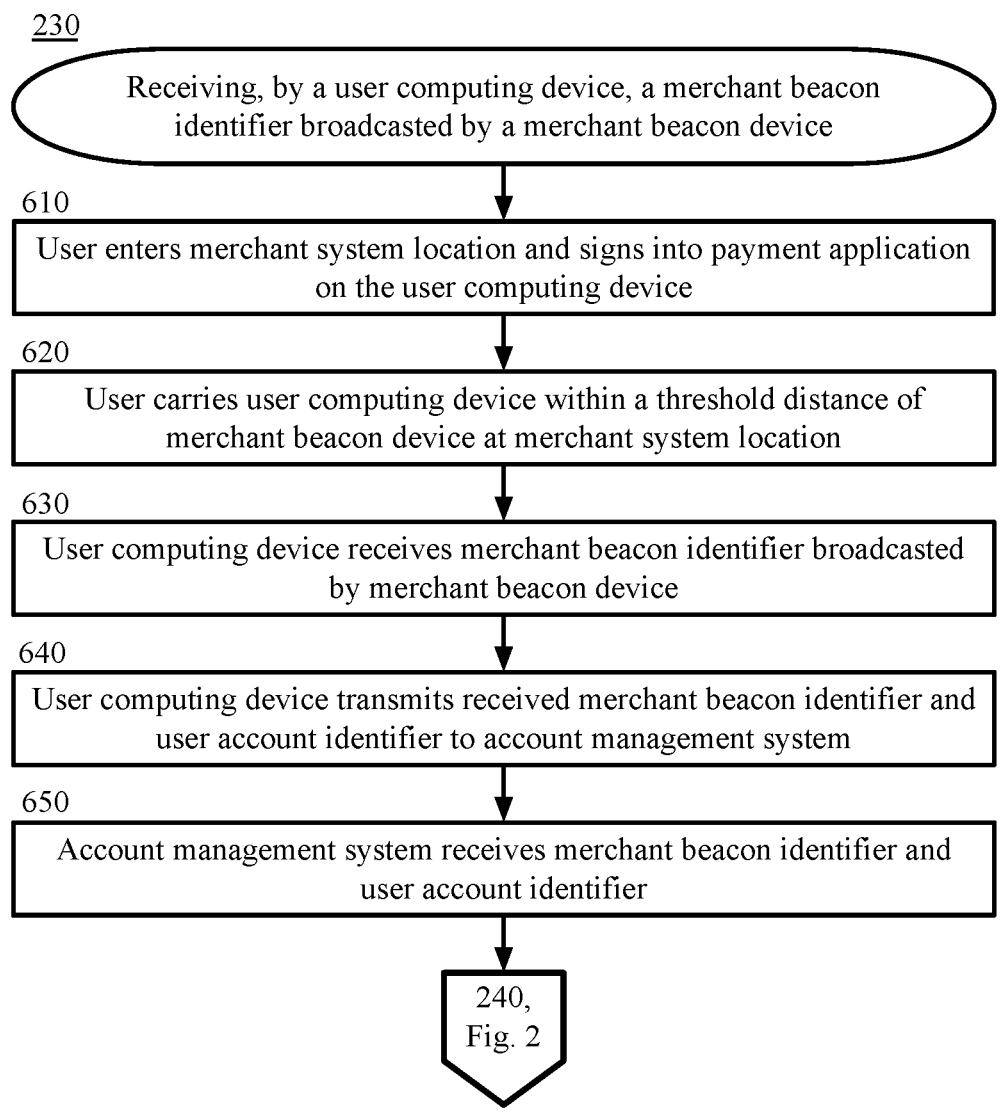
FIG. 6 is a block flow diagram depicting a method to receive, by a user computing device, a merchant beacon identifier broadcasted by a merchant beacon device, in accordance with certain examples.

FIG. 6 is a block diagram depicting a method 230 for receiving, by a user computing device 110, a merchant beacon identifier broadcast by a merchant beacon device 120, in accordance with certain examples. The method 230 is described with reference to the components illustrated in FIG. 1.

In block 610, the user 101 enters the merchant system location and signs into the payment application 113 on the user computing device 110. In another example, the user 101 signs into the payment application 113 at a time before entering the merchant system location and enters the merchant location carrying the user computing device 110 signed into the payment application 113. In another example, the payment application 113 is automatically signed into based on other authentication technologies. The payment application 113 may be activated manually by the user 101 or automatically when the user computing device 110 recognizes the beacon identifier.

In an example, the user 101 may have a username and password associated with the user 101 account maintained by the account management system 160. In an example, the user 101 opens the payment application 113 on the user computing device 110 and enters a username and/or password via the user interface 115 to sign in to the payment application 113. In an example, when the user 101 is signed in to the payment application 113, the payment application is able to communicate with the account management system 160 over the network 105. In this example, when the user 101 is not signed in to the payment application 113, the payment application does not communicate with the account management system 160 even if the a network 105 connection is available. In an example, the user 101 may sign out of the payment application 113 at any time by actuating one or more objects on the user interface 115 of the user computing device 110. In an example, after signing in to the payment application 113, the user 101 configure one or more user 101 account settings, add, edit, or delete user 101 payment account information, and/or change user 101 preferences. In certain examples, a user 101 may be required to make a feature selection to obtain the benefits of the techniques described herein. For example, the user 101 may have to enable one or more user 101 account settings to enable hands free transactions according to the methods described herein.

In an example, payment application 113 may provide options, data, configurable alerts, and other suitable features to the user 101. For example, the payment application 113 may comprise a listing of merchant systems and merchant locations that participate in hands free payment transactions according to one or more of the methods described herein. The listing may be updated periodically from the account management system 160. The payment application 113 may notify the user 101 when the user 101 is within a configured vicinity of a participating merchant system. The payment application 113 may provide the user 101 with options to update payment preferences. The payment application 113 may provide the user 101 with a listing of recent transactions. The payment application 113 may provide any other suitable information to the user 101.

In block 620, the user 101 carries the user computing device 110 within a threshold distance of the merchant beacon device 120 at the merchant system location. In an example, the user 101 enters a location of the merchant system. The user 101 may enter the merchant location carrying the user computing device 110 in a pocket or a bag, in the hands of the user 101, or in any suitable manner. The location of the merchant system may be a store location, a kiosk location, or any suitable physical location of a merchant system. In another example, a merchant POS operator 102 may be mobile and arrive at a location of the user 101. For example, the merchant system may be a restaurant and the merchant POS device operator 102 may be a delivery person possessing a portable merchant POS device 130.

In certain examples, the payment application 113 may alert the user 101 when the user 101 is in the vicinity of a merchant system that accepts hands-free payments. The alert may be provided via a message on the user computing device 110, via an email or a text, or in any suitable manner. In an example, the alert may be based on the location of the user 101 as determined by a GPS module (not depicted) resident on the user computing device 110. For example, the payment application 113 accesses the GPS data from the GPS module and compare the GPS location to a list of locations of merchant systems that accept hands free payments. For example, the payment application 113 comprises a list or accesses a list maintained by the account management system 160 of merchant system locations that accept hands free payments. If a match results from the comparison, then an alert is generated and provided to the user 101. The match may result if the user 101 is within a configured distance of a qualified merchant system location. In an example, the alerts may be configured to alert in any suitable manner. In an example, the alerts may be combined in commercially dense environments or the alerts may be presented individually. In another example, the alerts may be configured to only alert the user 101 a configured number of times. For example, the alert may be presented three times, but upon a fourth instance, the alert is not presented. The alerts may be presented as a notification with an audible alert, a vibration, a popup alert on the user interface 115 of the user computing device 110, or other suitable alert.

In block 630, the user computing device 110 receives a merchant beacon identifier broadcast by the merchant beacon device 120. The user computing device 110 recognizes a merchant beacon device 120 via wireless communication at the location of the merchant system. The user computing device 110 may be configured to search for beacons or other wireless signals. In an example, the user computing device 110 and the merchant beacon device 120 establish a BLE wireless network 105 connection. In other examples, the user computing device 110 and the merchant beacon device 120 establish a Bluetooth, Wi-Fi, NFC, or other appropriate network 105 connection. Upon entering the range of the signal of the merchant beacon device 120, the user computing device 110 receives the merchant beacon identifier.

In block 640, the user computing device 110 transmits the received merchant beacon identifier and a user 101 account identifier to the account management system 160. In an example, the user computing device 110 transmits the data received in the merchant beacon identifier along with a user 101 account identifier to the account management system 160 over the network 105.

In block 650, the account management system 160 receives the merchant beacon identifier and the user 101 account identifier. For example, the account management system 160 receives the merchant beacon identifier and the user 101 account identifier over the network 105. The user computing device 110 may compare the data from the merchant beacon identifier to a database of merchant beacon identifier data and merchant camera device identifier data to determine an identity of the merchant system and merchant camera device 140 associated with the merchant beacon identifier and/or to verify the authenticity of the beacon.

From block 650, the method 230 proceeds to block 240 in FIG. 2.

Returning to FIG. 2, in block 240, the merchant point of sale device 130 receives a facial template for each user 101 in range of the merchant beacon device 120. The method for receiving, by a merchant camera device 140, a facial template for each user 101 in range of the merchant beacon device 120 is described in more detail hereinafter with reference to the method 240 described in FIG. 7.

FIG. 7 is a block diagram depicting a method 240 for receiving, by a merchant camera device 140, a facial template for each user 101 in range of the merchant beacon device 120, in accordance with certain examples. The method 240 is described with reference to the components illustrated in FIG. 1.

In block 710, the account management system 160 extracts a facial template associated with the user account identifier. In an example, the account management system 160 accesses a database comprising stored facial templates of a plurality of users 101 with corresponding user account identifiers for each user 101. For example, this database is stored in the data storage unit 166. The account management system 160 identifies the facial template associated with the user account identifier and prepares the identified facial template for communication or use.

In block 720, the account management system 160 generates a payment token for a user payment account and notifies an issuer system of association of the payment token with the user payment account. In an example, the account management system 160 generates a payment token for each user 101 whose user computing device 110 is in network range of the merchant beacon device 120 and who is signed in to the payment application 113. An example payment token comprises a series of alphanumeric and/or symbolic characters. The example payment token may be associated with a payment account of the user 101 and be recognizable by an issuer system 150 associated with the payment account of the user 101. For example, the account management system 160 generates the payment token and communicates the payment token to an issuer system 150 associated with a payment account of the user 101 along with the user 101 payment account information. In this example, if the issuer system 150, at a later time after receiving the payment token from the account management system 160, receives the payment token from a point of sale device 130 in a payment transaction, the issuer system 150 is able to extract the user 101 payment account information associated with the payment token.

In some examples, the account management system 160 may place restrictions on payment tokens for security reasons or according to one or more configurations of the user 101 account desired by the user 101. For example, the payment token may only be valid for a preconfigured length of time, for example, one hour. In another example, the payment token may only be valid for us in a transaction between the user 101 and a particular merchant system. In yet another example, the payment token is only valid for use within a particular geographic boundary or within a threshold distance from a geographic point. In an example, the account management system 160 communicates one or more of these example restrictions to the issuer system 150 along with the payment token and the issuer system 150 associates these one or more restrictions with the payment token and the user 101 payment account data in a database of the issuer system 150.

In an example, the account management system 160 may communicate, to the issuer system 150 along with the payment token and the user 101 account data, a current time stamp representing a time when the payment token was generated to associate with the payment token. In another example, the account management system 160 may communicate, to the issuer system 150 along with the payment token and the user 101 account data, location data describing geographic boundaries and/or threshold distances from geographic points where the payment token may be used in a transaction.

In yet another example, the account management system 160 may communicate, to the issuer system 150 along with the payment token and the user 101 account data, a merchant system identifier and instructions that only payment authorization requests originating from merchant systems comprising the merchant system identifier may be approved. In an example, the issuer system 150 associates the payment token, the user 101 payment account data associated with the payment token, the one or more restrictions placed on the payment token by the account management system 160, and/or one or more of location data, time stamp data, merchant system identifier data, or other data that the issuer system 150 may use to determine whether the one or more restrictions on the payment token are satisfied to enable use of the payment token.

In another example, the payment token is generated by the payment application 113 on the user computing device 110 and communicated to the merchant POS device 130 or to the account management system 160. The generation of the token may follow similar processes and rules as described herein with tokens generated by the account management system 160.

In another example, the payment token is associated with a loyalty account of the user 101. The user 101 in this example, may purchase items using loyalty points or offers. The loyalty purchases may be in conjunction with payment account transactions or exist as a separate system.

In block 730, the account management system 160 identifies a merchant point of sale device 130 associated with the merchant beacon device 120 identifier. In an example, the account management system 160 recognizes that the merchant beacon identifier is associated with the account management system 160 and a particular merchant point of sale device 130 at the merchant system location. In an example, the account management system 160 recognizes that the merchant beacon identifier is associated with a plurality of merchant point of sale device 130 installed at a particular merchant location.

In block 740, the account management system 160 transmits the identified facial template of the identified user 101 along with the generated payment token to the merchant point of sale device 130 associated with the merchant beacon device 120 identifier. In another example, the account management system 160 transmits the facial template of the identified user 101 and the generated payment token to a plurality of merchant point of sale devices 130 associated with the merchant beacon device 120 identifier. In certain examples, the account management system 160 receives, in real time, a plurality of transmissions from user computing devices 101 corresponding to a plurality of users 101 present at the merchant system location, each transmission comprising a user 101 account identifier and a retransmitted merchant beacon identifier. In these examples, the account management system 160 retrieves, in response to receiving each such transmission, a facial template associated with the received user 101 account identifier and transmits a facial template to one or more merchant point of sale devices 130 at the merchant location associated with the merchant beacon identifier.

In block 750, the merchant point of sale device 130 receives the facial template of the user 101. In another example, in addition to or instead receiving the facial template, the merchant point of sale device 130 receives an audio template and/or a challenge and response associated with the user 101 account. In another example, a plurality of merchant point of sale devices 130 receive the facial template of the user 101. In yet another example, the merchant point of sale devices and/or the plurality of merchant point of sale devices 130 receives additional facial templates from the account management system 160 corresponding to one or more users other than the instant user 101 having user computing devices 110 in network 105 connection to a merchant beacon device 120 according to the method previously described herein. For example, the one or more additional facial templates are received in real time from the account management system 160 as additional users 101 other than the instant user 101 receive the merchant beacon device 120 identifier over a wireless communication network 105 or otherwise establish a network 105 connection between their user computing devices 110 and one or more merchant beacon devices 120. For example, the one or more merchant point of sale devices 130 may receive one or more additional facial templates corresponding to one or more additional users 101 at a time before, at the same time, or after the time at which the merchant point of sale devices 130 receives the facial template of the instant user 101.

In block 760, the merchant point of sale device 130 adds the facial template of the user 101 to a current customer log. In an example, the current customer log is accessible by the merchant point of sale device 130 and by the account management system 160. In an example, the merchant point of sale device 130 maintains the current customer log on the merchant point of sale device 130 or on a computing device logically connected to the merchant point of sale device 130.

In block 770, the merchant point of sale device 130 periodically updates the current customer log. The merchant point of sale device 130 is notified by the account management system 160 as users 101 signed into a payment account enter or leave a network range of the merchant beacon device 120. From block 770, the method 240 returns to block 250 of FIG. 2.

Returning to block 250, in FIG. 2, the user 101 initiates a transaction at the merchant POS device 130.

The method for initiating, by a user 101, a transaction at a merchant point of sale device 130 is described in more detail hereinafter with reference to the method 250 described in FIG. 8. In the examples described herein, the user 101 initiates a "hands free transaction" at the merchant POS device 130. An example hands free transaction does not require any interaction with the user computing device 110 on the part of the user 101. In another example, a hands free transaction requires only minimal interaction with the user computing device 110 by the user 101.

Figure 8:
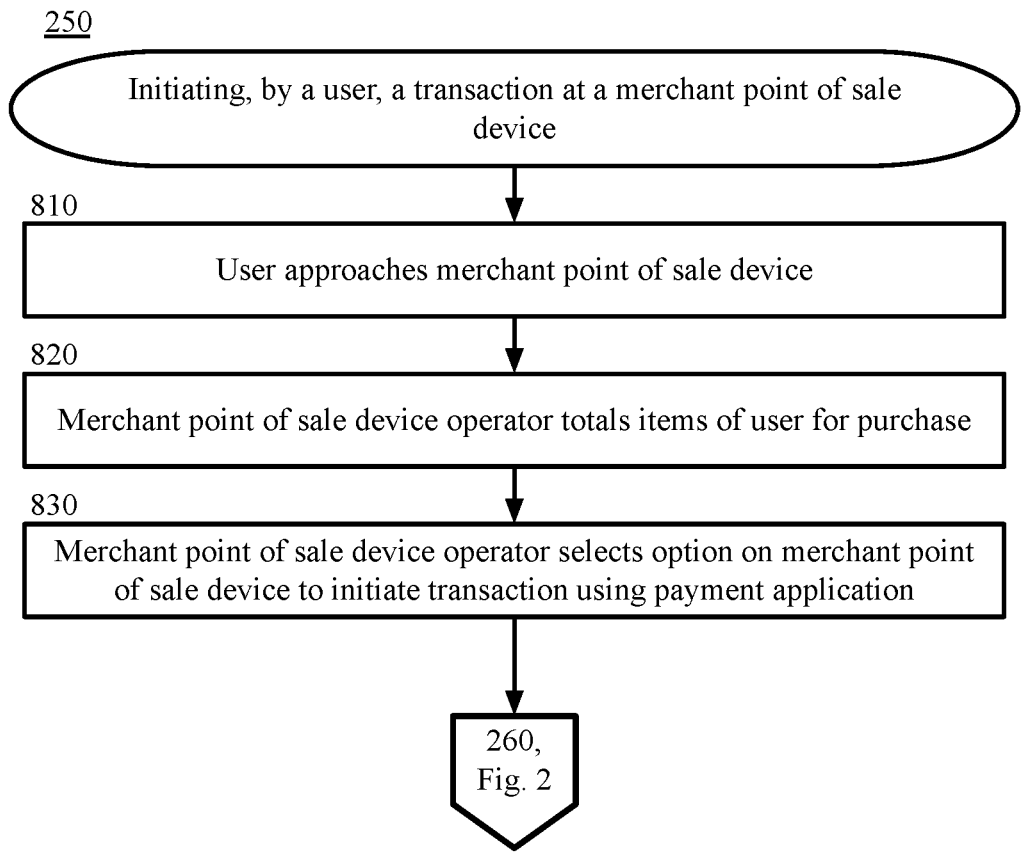
FIG. 8 is a block flow diagram depicting a method to initiate, by a user, a transaction at a merchant point of sale device, in accordance with certain examples.

FIG. 8 is a block diagram depicting a method 250 for initiating, by a user 101, a transaction at a merchant POS device 130, in accordance with certain examples. The method 250 is described with reference to the components illustrated in FIG. 1.

In block 810, the user 101 approaches the merchant point of sale device 130. In an example, at a time prior to approaching the merchant POS device 130, the user 101 browses the merchant system location and selects one or more items to purchase. In this example, the user 101 may collect the one or more items and carry, or otherwise transport the one or more items to the merchant POS device 130. Throughout the example, the items purchased may be tangible or non-tangible items, such as services.

In block 820, the merchant point of sale device 130 operator 102 totals the items of the user 101 for purchase. In an example, the merchant POS device operator 102 scans barcodes attached to the one or more items or otherwise enters descriptions and prices associated with the one or more items into the merchant POS device 130. In an example, after scanning or manually entering the items into the merchant POS device 130, the merchant POS device operator 102 actuates an object on the user interface 135 of the merchant POS device 130 to order the merchant POS device 130 to total the items. In an example, the merchant POS device 130 displays, via the user interface 135, the total to the user 101.

In block 830, the merchant point of sale device 130 operator asks the user 101 to select a payment option. In an example, the merchant POS device 130 displays one or more payment options that the user 101 may select to use in a transaction. Example payment options may comprise payment via a payment application 113 associated with the account management system 160, payment by cash, payment by check, payment by credit card, payment by debit card, and/or any other means of payment that the merchant system can or is willing to accept for payment from the user 101. In an example, the one or more payment options are displayed as objects on the user interface 135 and are selectable by the merchant POS device operator 102 in response to the user 101 directing the merchant POS device 102 operator to make a selection.

In block 840, the user 101 directs the merchant point of sale device operator 102 to initiate a hands-free transaction via the payment application 113. In an example, in response to receiving a verbal request from the user 101 to select the payment application 113 as a payment option, the merchant POS device operator 102 actuates an object on the user interface 135 of the merchant POS device 130 corresponding to the payment application 113 payment option. In certain examples, the hands-free transaction is the only option available, and a direction from the user 101 to the operator 102 is not necessary.

In block 850, the merchant point of sale device operator 102 selects an option on the merchant point of sale device 130 to initiate a transaction using the payment application 113. In an example, the merchant POS device 130 displays a confirmation screen after the merchant POS device operator 102 selects an option to initiate a transaction using the payment application 113. An example confirmation screen may display information summarizing the potential transaction and comprising one or more of a transaction total, a description of the one or more items being purchased by the user 101, and a indication that the user 101 selected the payment application 113 as the method of payment for the transaction. An example confirmation screen may further display options to confirm the transaction or cancel the transaction. In an example, the user 101 reviews the confirmation screen, determines that the information displayed on the confirmation screen is correct, determines to continue with the transaction, and directs the merchant POS device operator 102 to select the option to confirm the transaction via the user interface 135.

From block 850, the method 250 proceeds to block 260 in FIG. 2.

Returning to FIG. 2, in block 260, the merchant point of sale device 130 identifies the user 101 via facial recognition. The method for identifying, by a merchant point of sale device 130, a user 101 via facial recognition is described in more detail hereinafter with reference to the method 260 described in FIG. 9. In other examples, the merchant point of sale device 130 identifies the user 101 via audio recognition and/or via a challenge and response.

Figure 9:
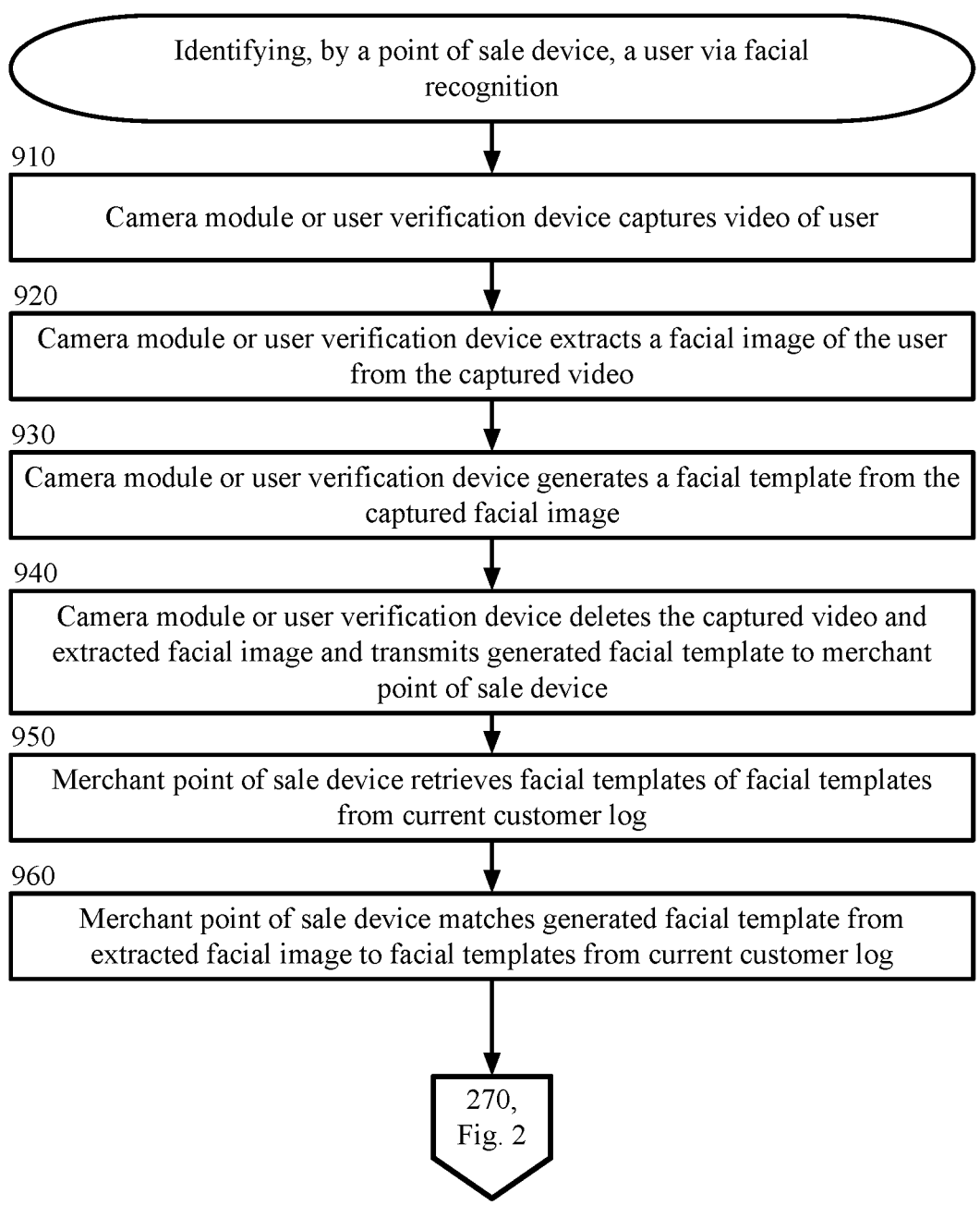
FIG. 9 is a block flow diagram depicting a method to identify, by a point of sale device, a user via facial recognition, in accordance with certain examples.

FIG. 9 is a block diagram depicting a method 260 for identifying, by a merchant point of sale device 130, a user 101 via facial recognition, in accordance with certain examples. The method 260 is described with reference to the components illustrated in FIG. 1. In certain examples, the functions of the camera module 132 described herein are performed by the stereo camera 153. In certain examples, the functions of the POS device 130 described herein are performed by the user verification device 150.

In block 910, a camera module 132 of the merchant point of sale device 130 captures video of the user 101. In an example, in response to receiving a request to identify the user 101, the merchant point of sale device 130 activates the camera module 132 to begin to capture a video of the surroundings of the merchant point of sale device 130. In an example, the merchant POS device 130 captures a video feed of the user's 101 face. In another example, the camera module 132 continuously captures, but does not record, a video feed of its surroundings. In this example, when the merchant point of sale device 130 receives an input from the merchant POS device 130 operator 102, a request to identify the user 101 from the account management system 160, the camera module 132 beings to record the video feed for a threshold amount of time. In an example, the user 101 may be moving during the period in which the camera module 132 records the video feed. In an example, the camera module 132 extracts a facial image by determining a particular frame of the video feed and area of the instance of the video feed corresponding to the face of the user.

In block 920, the camera module 132 extracts a facial image of the user 101 from the captured video. In an example, the camera module 132 determines a frame of the captured video to provide an image of the user's 101 face and extracts the frame of the captured video comprising the facial image of the user 101.

In certain other examples, the camera module 132 identifies a frame of the captured video to provide an image of the faces of a plurality of users 101. For example, the frame comprises an image of the face of a first user 101, a second user, and a third user at different locations in the image. In this example, one camera module 132 associated with a particular merchant point of sale device 130 may capture video of an environment corresponding to an area in the proximity of multiple merchant POS devices 130. In this example, the camera module 132 may determine to which particular merchant POS device 130 each of the plurality of faces of the corresponding plurality of users 101 in the extracted image.

In block 930, the camera module 132 generates a facial template from the captured facial image. In another example, the merchant point of sale device 130 generates the facial template. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example, the camera module 132 stores the generated facial template in a data storage unit 146 associated with the merchant point of sale device 130. For example, the camera module 132 database may comprise a log of facial templates of current customers wherein the merchant point of sale device 130 stores the generated facial template.

In certain other examples, the camera module 132 continuously captures a video feed of its surroundings as users 101 enter and leave the vicinity of one or more merchant POS devices 130 over the course of a certain time period. In this example, the merchant point of sale device 130 and/or camera module 132 is able to continuously monitor the incoming video feed to detect faces from extracted frames of the video feed. In this example, the camera module 132, each time the camera module 132 detects the presence of one or more faces in the video feed, the camera module 132 extracts a frame of the video feed comprising one or more facial images of one or more corresponding detected faces and creates facial templates based on the extracted one or more facial images. In this example, the merchant point of sale device 130 stores facial templates in the log of facial templates of current customers as they are generated. In this example, as the camera module 132 or the merchant point of sale device 130 generates a subsequent facial templates, the merchant point of sale device 130 determines whether the generated subsequent facial template is similar to within a threshold compared to any of the facial templates already stored in the log of facial templates of current customers. If the generated subsequent facial template is similar to within a threshold to any of the facial templates already stored in the log, the merchant point of sale device, after associating the facial template to one or two particular merchant POS devices 130 based on the position of the associated facial images in the extracted frame of the captured video, adds the facial template to the log of facial templates of current customers. If the generated subsequent facial template is not similar to within a threshold to any facial templates already stored in the log of facial templates of current customers, the merchant point of sale device 130 deletes or otherwise ignores and/or does nothing with the generated facial template. In this example, if the merchant point of sale device 130 determines that certain facial image is no longer in the field of the video feed, the corresponding facial template is deleted from the log of facial templates of current customers.

In block 940, the camera module 132 deletes the captured video and the extracted facial image. For example, the camera module 132 does not store captured images or video. In this example, facial templates generated by the camera module 132 comprise computer code representations of facial images of users 101. In this example, after generating a facial template or after a threshold time has passed after capturing video or images or extracting an image from a video, the merchant camera device 140 deletes any captured or extracted video or images.

In block 950, the merchant point of sale device 130 retrieves facial templates from the current customer log. For example, the current customer log comprises facial templates received from the account management system 160 corresponding to all current users 101 whose associated user computing devices 110 are located within a network distance of a merchant beacon device 120.

In block 960, the merchant point of sale device 130 compares the generated facial template from captured facial image to facial templates from the current customer log. The merchant point of sale device 130 may compare each feature of the captured facial template from the current customer log to a corresponding feature in the generated facial template to identify similarities and differences. For example, if one feature is the length of the nose of the user 101, then the stored nose length of the generated facial template is compared to the nose length of the captured facial template. Any suitable comparison of any quantifiable features may be performed.

In block 970, the merchant point of sale device 130 determines whether there is a match between the generated facial template and one of the facial templates from the current customer log. If a facial template from the current customer log matches the generated facial template, the method 260 proceeds to block 270 in FIG. 2. For example, the merchant point of sale device 130 processes a transaction.

If none of the facial templates from the current customer log matches the generated facial template, the method 260 repeats the process to seek a match.

Returning to block 270, in FIG. 2, the point of sale device 130 identifies which of a plurality of users is attempting to conduct a transaction. The method 270 for identifying, by an account management system 160, which of a plurality of users is attempting to conduct a transaction is described in more detail hereinafter with reference to the method 270 described in FIG. 10.

Figure 10:
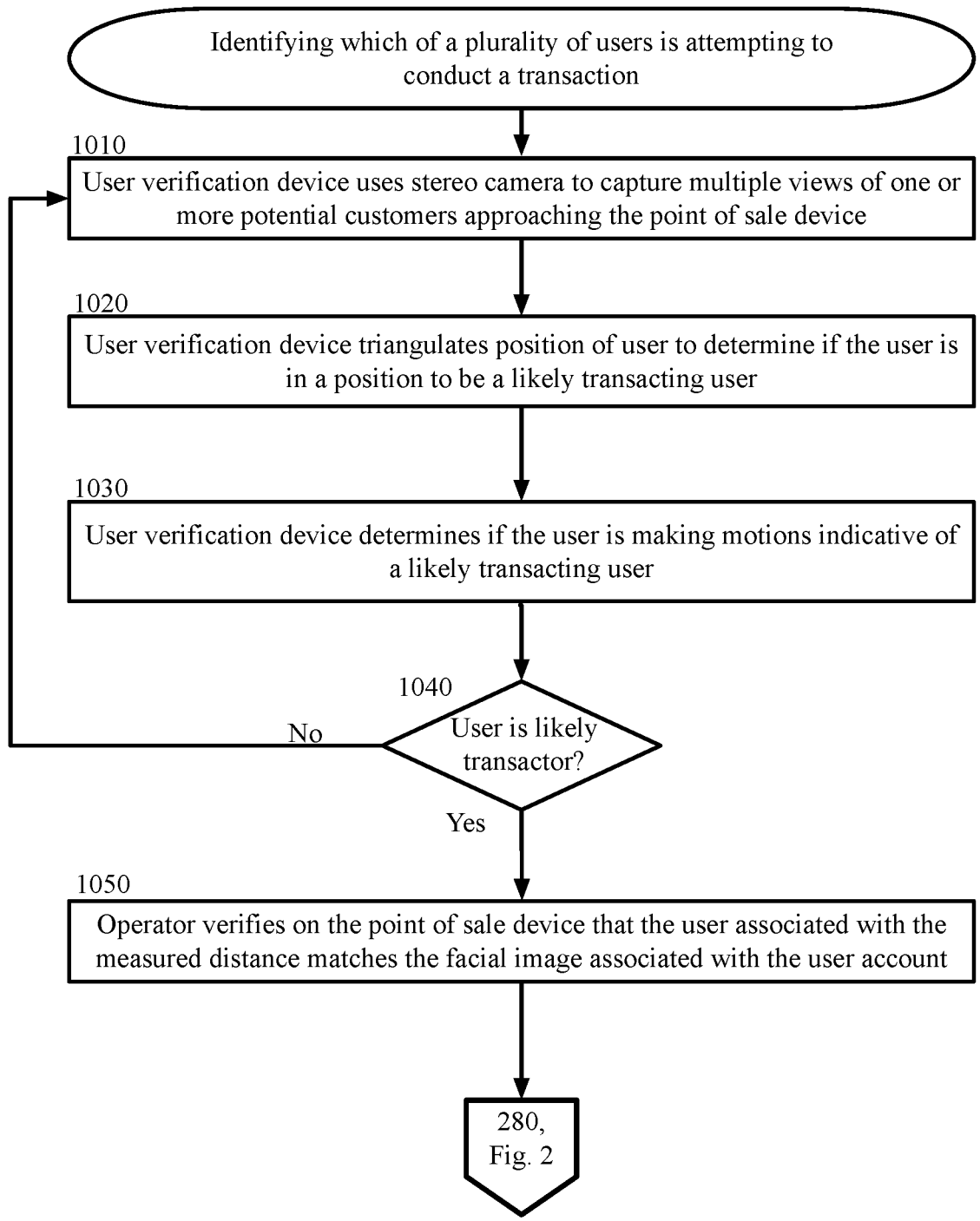
FIG. 10 is a block flow diagram depicting a method to identify which of a plurality of users is attempting to conduct a transaction, in accordance with certain examples.

FIG. 10 is a block diagram depicting a method 270 for identifying, by an account management system 160, which of a plurality of users is attempting to conduct a transaction, in accordance with certain examples. The method 270 is described with reference to the components illustrated in FIG. 1.

In block 1010, the user verification device 150 uses the stereo camera 153 to capture multiple views of one or more potential customers approaching the POS device 130. In an example, the stereo camera 153 is a single camera with multiple lenses. In another example, two separate cameras are installed and the processor 152 of the user verification device 150 manages both cameras. In another example, a stereo camera 153 may be comprised of two separate cameras, each with a processor for processing the images. The separate processed images are communicated to the processor 152 for analysis. Any configuration of camera or cameras that produces multiple angles of the image may be utilized.

In block 1020, the user verification device 150 triangulates the position of the user 101 to determine if the user 101 is in a position to be a likely transacting user. The user verification device 150 uses the stereo camera 153 to capture multiple views of one or more potential customers approaching the POS device 130. The user verification device 150, the POS device 130, the merchant system, the account management system 160, or any other suitable system may analyze the image to determine which person in the image is likely the person at the front of the line to conduct a transaction. Throughout the specification, the user verification device 150 will represent any computing system that performs the functions of the method 270. For example, the user verification device 150 may transmit facial images to the account management system 160 for analysis and receive back an analysis.

In one example, the user verification device 150 uses the differing perspectives of the stereo camera 153 to triangulate the location of the one or more users to determine which user is the likely transacting user. For example, if two camera modules of the stereo camera 153 obtain different perspectives of the user 101, the user verification device 150 may digitize the images, generate a three-dimensional model of the images, and triangulate the location of the user 101. Any other suitable processing of the images may be utilized to triangulate the position of the user 101.

If the user 101 is in a likely spot that a transactor would be located, then the user 101 is determined to be the transactor. In an example, a transactor would be a user 101 that is directly before the POS device 130 and at the sales counter. A person that is farther back or positioned to the side would not be a likely transactor. For example, a person that has already paid for an item, but is waiting for the item to be prepared, will likely move to the side or to a designated pickup area. This person will likely not be the transacting user 101. In another example, a person standing farther away from the POS device 130 is likely to be waiting in line or just passing by. This person will likely not be the transacting user 101. Any other person in the image that is not in the preferred position is likely to be a person other than the transacting user 101.

The user verification device 150 may be trained to recognize the position of a likely transactor. For example, to train the user verification device 150 or to determine a configured standard position, an operator 102 may stand in one or more likely positions to be conducting a transaction and have the user verification device 150 capture an image. Knowing that the operator 102 was in a likely position to make a transaction, the user verification device 150 triangulates the position of the operator 102 and stores the position. The training procedure may be performed from more than one likely position to allow a measurement tolerance to be predicted. That is, the user verification device 150 may determine that the standard allows a match for a user 101 in a specific position plus or minus one meter in any direction.

In certain examples, the triangulation process is improved if the user verification device 150 has used facial recognition to identify the user 101 or received facial recognition from the POS device 130 or another suitable device. That is, when the user 101 has been identified, the user verification device 150 may use the parameters of the facial recognition to improve the three-dimensional model of the space before the POS device 130. When multiple cameras of the stereo camera 153 are attuned to the face of the user 101, then the remaining portion of the image may be ignored, making the triangulation more efficient and accurate. The known characteristics of the face of the user 101 provide a common point of reference for the two images to be triangulated.

In block 1030, the user verification device 150 determines if the user 101 is making motions indicative of a likely transacting user. The user verification device 150 logs the motions made by the user 101, characterizes the motions, compares the motions to a standard, and determines if the motions indicate that the user 101 is conducting a transaction. In an example, motions include reaching across the counter, looking at the salesperson, looking at a menu, speaking to a salesperson, or any other motion that transactors are likely to make. For example, the user verification device 150 may be trained to recognize that a person turning his or her face to a salesperson and holding the position for a certain period of time, is likely to be conducting a transaction. If the user 101 performs this same action, then the user verification device 150 may determine that the user 101 is likely to be conducting a transaction.

In block 1040, the user verification device 150 determines if, based on the indicators discussed herein, that the user 101 is likely to be the transactor. If the user 101 is not likely to be the transactor, then the user verification device 150 returns to block 1010 to obtain another image for comparison. In the example, the user verification device 150 determines that the user 101 is not in the correct position and/or is not performing any motions indicative of a transaction. By returning to block 1010, the user verification device 150 may identify a second user in the image or obtain a second image of the user 101. Any iteration of the process may be repeated until an image is obtained that indicates that the user 101 is in the preferred position of a user 101 attempting a transaction and/or is making the appropriate motions.

If the user 101 is likely to be the transactor, then block 1040 proceeds to block 1050.

In block 1050, the operator 102 verifies on the POS device 130 that the user 101 associated with the measured distance matches the facial image associated with the user account. For example, the POS device 130 may display an image to the POS device operator 102 on a user interface of the POS device 130 to allow the operator 102 to note if the appropriate user 101 is attempting the purchase. If the user 101 does not appear to be the person that is in the image associated with the user account, then the operator 102 may ask for further identification or perform any other suitable actions to verify the user 101. If the user 101 does match the image, then the salesperson may indicate the match in any suitable manner, such as by actuating a virtual button to conduct the transaction.

In another example, the POS device 130 receives a communication from the user verification device 150 that the user 101 is making the transaction and the POS device 130 conducts the transaction with the account data of the user 101. The POS device 130 does not require any input from the user 101 or the operator 102.

From block 1050, the method 270 returns to block 280 of FIG. 2.

Returning to FIG. 2, in block 280, a transaction is processed. The method for processing a transaction is described in more detail hereinafter with reference to the method 280 described in FIG. 11.

Figure 11:
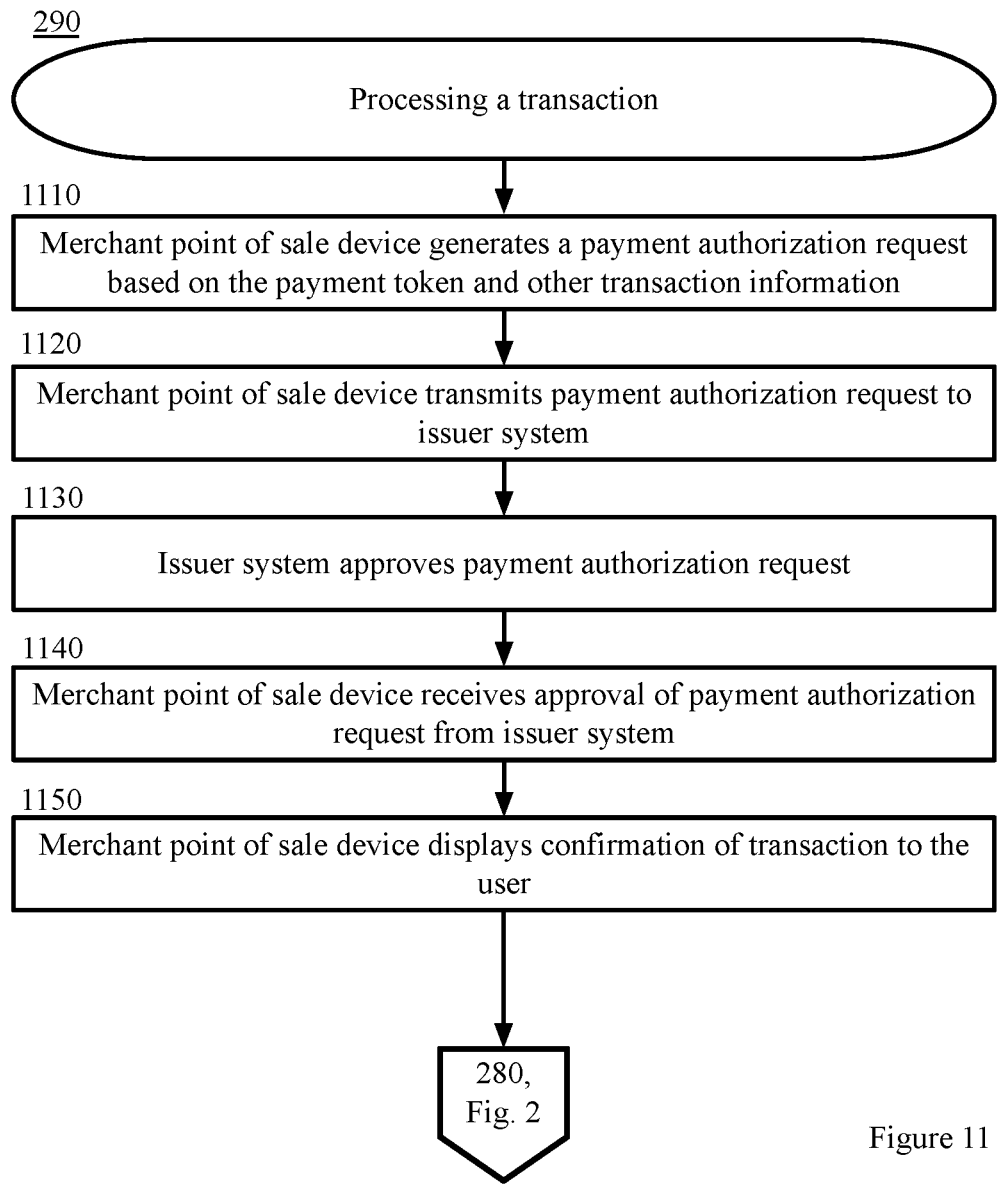
FIG. 11 is a block flow diagram depicting a method to process a transaction, a user via facial recognition, in accordance with certain examples.

FIG. 11 is a block diagram depicting a method 280 for processing a transaction, in accordance with certain examples. The method 280 is described with reference to the components illustrated in FIG. 1.

In block 1110, the merchant point of sale device 130 generates a payment authorization request based on the payment token and other transaction information. In an example, the payment authorization request comprises the payment token received from the account management system 160 for the user 101 along with transaction details including a transaction total, a description of one or more items being purchased, a merchant identifier, a merchant payment account identifier, and/or other relevant transaction details.

In block 1120, the merchant point of sale device 130 transmits the payment authorization request to the issuer system (not pictured). For example, the merchant point of sale device 130 communicates the payment authorization request to the issuer system 150 via the network 105.

In block 1130, the issuer system approves the payment authorization request. In an example, the issuer system identifies the user payment account based on the received payment token. For example, the issuer system accesses a database that associates payment tokens with user 101 payment account identifiers. In an example, the database may further associate payment tokens with one or more conditions, such as a length of time for which the payment token is valid. For example, a payment token may only be valid for a threshold length of time, for example one hour, after it is generated by the account management system 130. In this example, as part of the transaction details in the payment authorization request, a current timestamp is received from the merchant point of sale device 130 and the issuer system compares the received timestamp from the transaction details to the one or more time conditions described in the database associated with the payment token and/or one or more data received from the account management system 160 at the time of the receipt of the payment token.

In another example, the payment token is valid only for use at a particular merchant system. In this example, the transaction details received with the payment authorization request from the merchant point of sale device 130 identifier comprise a merchant system identifier. In this example, the issuer system determines that the payment token is valid if the merchant identifier received in the transaction details of the payment authorization request match the merchant identifier in the one or more conditions associated with the payment token in the database. In certain other examples, other conditions related to time, location, merchant identifier, or a combination of these conditions and/or other conditions may be specified in the database as associated with one or more particular payment tokens. In an example, the issuer system verifies that a payment token received as part of a payment authorization request is valid based at least in part on data received from the merchant point of sale device 130 and/or data currently available to the issuer system. In an example, to process the transaction, the issuer system identifies the user payment account associated with the received payment token in the database processes the transaction using the transaction details and the user payment account information.

In certain example, the payment token is associated with a loyalty account and consists of only options to purchase an item with loyalty points, rewards, or offers. In this example, a payment instrument may or may not be associated with the loyalty account. The loyalty account data may serve in lieu of the payment instrument process described herein.

In block 1140, the merchant point of sale device 130 receives an approval of the payment authorization request from the issuer system. In an example, the issuer system either approves or declines the payment authorization request. In this example, the issuer system may base the decision of whether to approve or decline the payment authorization request based on a total amount of transaction the current available credit of the user 101 for the user 101 payment account. In an example, the merchant point of sale device 130 receives, via the network 105, the approval of the payment authorization request from the issuer system if the issuer system approves the payment authorization request. In another example, the merchant point of sale device 130 receives a notice of declined payment authorization request from the issuer system via the network 105 if the issuer system declines the payment authorization request.

In block 1150, the merchant point of sale device 130 displays a confirmation of the approved transaction to the user 101. An example confirmation of the approved transaction may include a total amount charged to the user 101 payment account, an identification of the user 101 payment account, a merchant system name, and/or other relevant or useful information. In another example, the merchant point of sale device 130 displays a notification of a declined transaction in response to receiving a notice of declined payment authorization request from the issuer system. For example, the merchant point of sale device 130 displays a message reading "This transaction has been declined" to the user via the user interface 135 of the merchant point of sale device 130. In another example, the merchant point of sale device 130 prints a receipt for the user 101.

Figure 12:
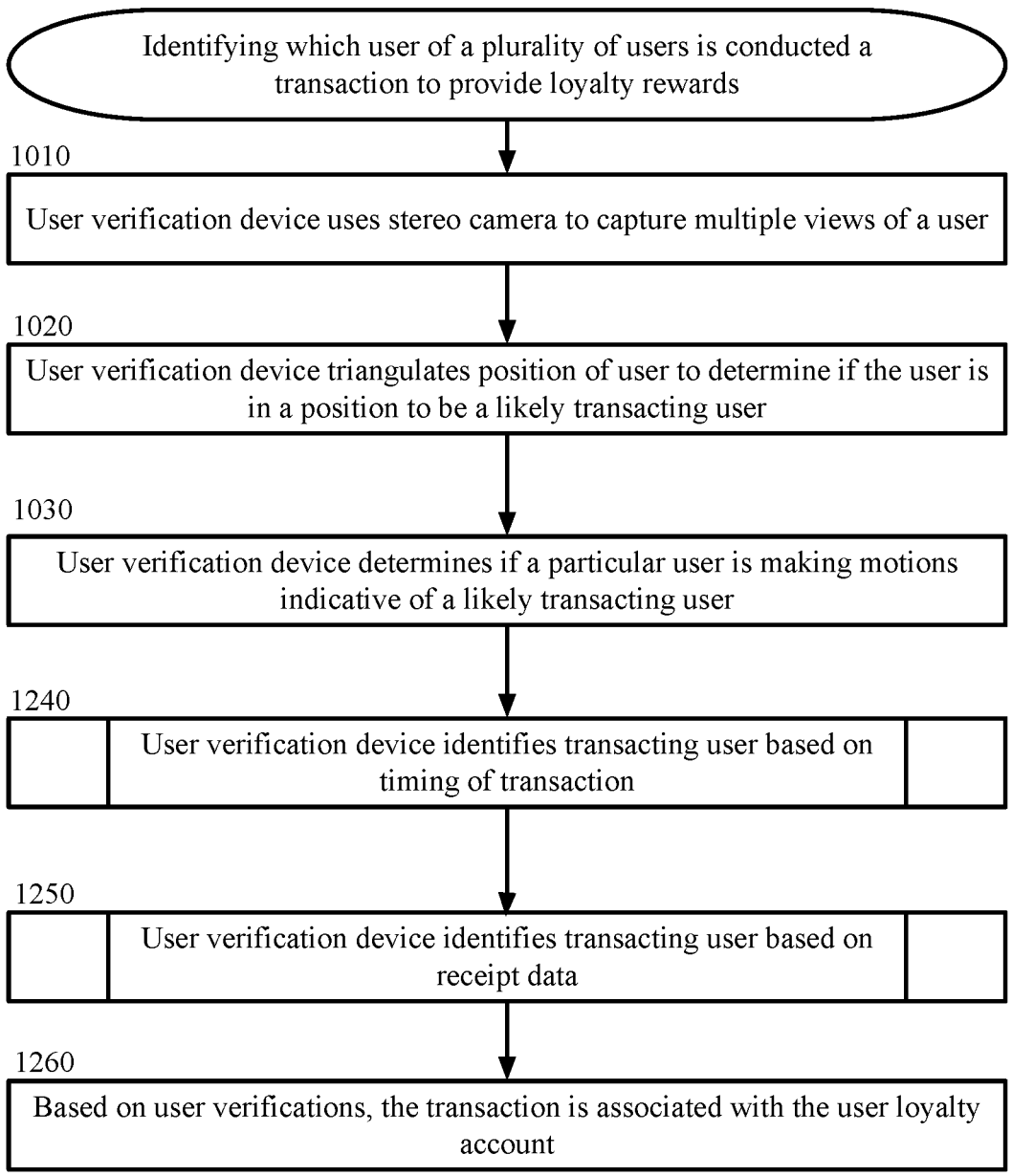
FIG. 12 is a block flow diagram depicting a method to identify which of a plurality of users is conducting a transaction to provide loyalty rewards, in accordance with certain examples.

FIG. 12 is a block flow diagram depicting a method 1200 to identify which user 101 of a plurality of users is conducting a transaction to provide loyalty rewards, in accordance with certain examples. In the following examples of FIGS. 12-14, the merchant system may not have positively identified the user 101 to conduct a hands-free transaction. For example, if the user 101 paid cash and the user account has not been identified, then the account management system 160 (or any other suitable system) may not have the opportunity to provide loyalty points, rewards, offers, or any other benefits to the user account.

In block 1010, the user verification device 150 uses the stereo camera 153 to capture multiple views of one or more potential customers approaching the POS device 130. This block is performed substantially the same as described in block 1010 of FIG. 10.

In block 1020, the user verification device 150 triangulates the position of the user 101 to determine if the user 101 is in a position to be a likely transacting user. This block is performed substantially the same as described in block 1020 of FIG. 10.

In block 1030, the user verification device 150 determines if the user 101 is making motions indicative of a likely transacting user. This block is performed substantially the same as described in block 1030 of FIG. 10.

Figure 13:
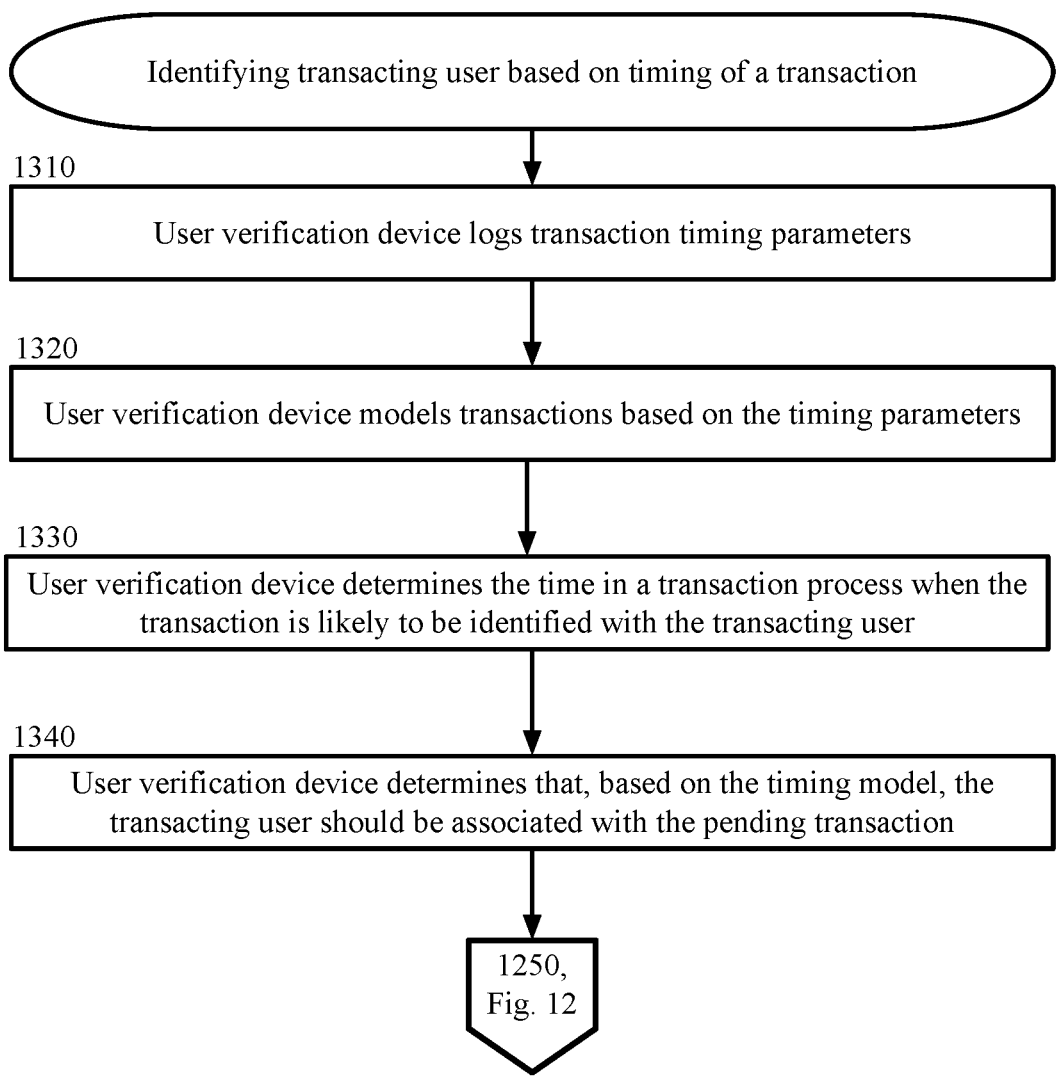
FIG. 13 is a block flow diagram depicting a method to identify transacting users based on timing of a transaction, in accordance with certain examples.

In block 1240, the user verification device 150 identifies the transacting user 101 based on timing of the transaction. Block 1240 is described in greater detail in the method 1240 of FIG. 13. FIG. 13 is a block flow diagram depicting a method to identify transacting users based on timing of a transaction, in accordance with certain examples.

In block 1310 of FIG. 13, the user verification device 150 logs transaction timing parameters of customers conducting transactions with the merchant POS device 130. The user verification device 150 may log the total length of time of transactions to train the system. For example, the user verification device 150 may log the time required from the moment the operator 102 initiates the transaction by tapping the POS device, scanning a barcode on a tag, or performing any other initiating action, until the transaction is completed, and a receipt is issued. In another example, the user verification device 150 may log the time required from the initiation of the transaction until the user 101 is presented with a product. In another example, the user verification device 150 may log the time required from the initiation of the transaction until the user 101 walks away from the POS device 130. Any suitable transaction timing parameter may be logged.

In block 1320, the user verification device 150 models transactions based on the timing parameters. The user verification device 150 may model different types of transactions based on the time required to complete them. For example, the user verification device 150 may model a typical time for a cash transaction and a different typical time for a credit card transaction.

In block 1330, the user verification device 150 determines the time in a transaction process when the transaction is likely to be identified with the transacting user 101. The user verification device 150 determines a time in the current transaction when the identification of the user 101 is most likely to be associated with the current transaction. For example, if the user verification device 150 determines that the user 101 should be identified at the moment the transaction is initiated, the user verification device 150 might erroneously identify the previous customer that has not yet left the transaction area. That is, the previous transactor might still be standing before the POS device 130 when the operator begins the process of initiating the next transaction. If the user verification device 150 selects this moment to identify the transacting user, then the user verification device 150 might identify the customer that is standing before the POS device 130 and not the actual transacting user 101. If the user verification device 150 waited 30 seconds after initiation to identify the transacting user 101, the actual transacting user 101 may have already left and a new customer may have approached the POS device 130. Therefore, the user verification device 150 must select a preferred time for identifying the user 101 based on the transaction models.

In block 1340, the user verification device 150 determines that, based on the timing model, the transacting user 101 should be associated with the pending transaction. In an example, if every transaction, regardless of the payment method, requires at least 20 seconds to conduct, then the user verification device 150 might select 15 seconds after initiation to identify the user. Thus, at 15 seconds after initiation of the transaction by the operator 102, the user verification device 150 initiates the identification process.

From block 1340, the method 1240 returns to block 1250 of FIG. 12. In block 1250 of FIG. 12, the user verification device 150 identifies the transacting user 101 based on receipt data.

Figure 14:
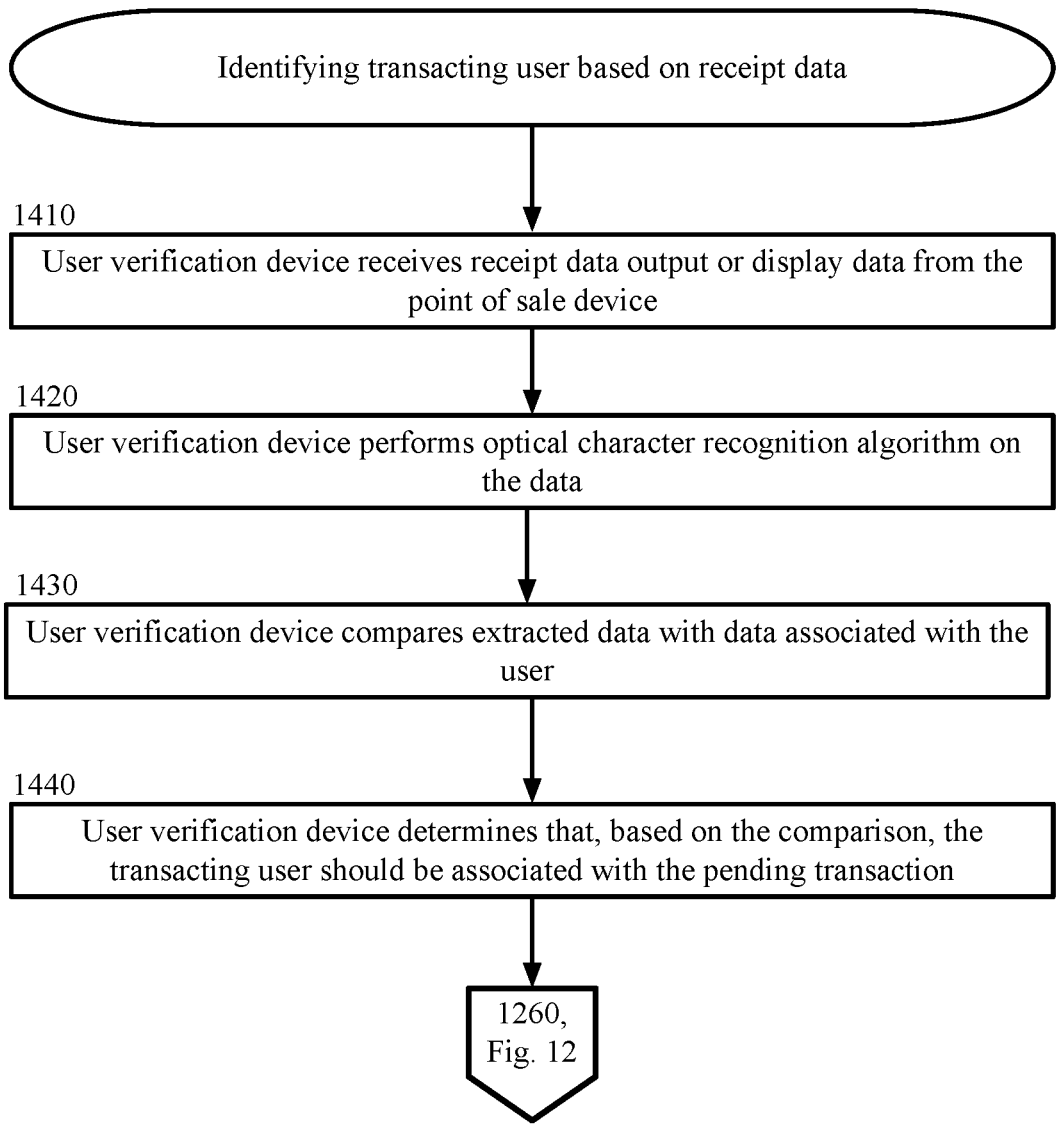
FIG. 14 is a block flow diagram depicting a method to identify transacting users based on receipt data, in accordance with certain examples.

Block 1250 is described in greater detail in the method 1250 of FIG. 14. FIG. 14 is a block flow diagram depicting a method to identify transacting users based on receipt data, in accordance with certain examples.

In block 1410, the user verification device 150 receives receipt data output or display data from the POS device 130. For example, the user verification device 150 may emulate a monitor or printer to receive data from the POS device 130. The user verification device 150 may retransmit the data to a monitor or printer if necessary. The data may be any data that is printed on a receipt or displayed to the user 101 or the operator 102 on a monitor.

In block 1420, the user verification device 150 performs an optical character recognition algorithm ("OCR") on the data. For example, if the data is receipt data that is to be printed, the user verification device 150 extracts the data from the image for printing. The user verification device 150 characterizes and parses the data to identify useful data. For example, the user verification device 150 may identify a user name, all or part of an account number, a card type, or any other useful data. In another example, the user verification device 150 performs an OCR algorithm on data that is being communicated to a monitor for display. This display may include data that may be extracted and used by the user verification device 150, such as a user name, all or part of an account number, a card type, or any other useful data.

In block 1430, the user verification device 150 compares extracted data with data associate with the user 101. The user verification device 150 searches for matches of the extracted data and the data of the user 101. For example, the user verification device 150 may determine that a partial account number on the receipt matches the numbers of the user account number, such as the last four digits. In another example, the card type of the transaction, such as debit card from a certain bank, matches the card type often used by the user 101. Any other suitable matches may be used.

In block 1440, the user verification device 150 determines that, based on the comparison, the transacting user 101 should be associated with the pending transaction. When matches exist based on the comparison, the user verification device 150 determines that the user 101 that was identified as a likely transacting user, is more likely to be the actual transacting user than if no matches are identified. Having the same card type, for example, might not positively identify the user 101 as the transacting user, but the indication may be utilized as a signal that the association is more likely. In other examples, a positive identification may be made based on the data. For example, if the entire account number is displayed and is matched to the user account, then the user 101 may be identified as the transactor. Thus, the method 1250 may be used as a signal or indicator to support or verify identification or as the identification itself.

From block 1440, the method 1250 returns to block 1260 of FIG. 12. In block 1260 of FIG. 12, based on user verifications, the transaction is associated with the user loyalty account. If the user verification device 150 obtains an indication that the user 101 is in a likely position to be a transactor, has made motions indicative of a transactor, and the receipt data indicates that the user 101 the transactor, then the user verification device 150 determines that the user 101 is the transactor and associates the transaction with the loyalty account of the user 101.

In certain examples, the user verification device 150 determines how many matches or verifications are required to associate the transaction with the loyalty account. For example, the user verification device 150 may determine that based on the position of the user 101 and the motions of the user 101, that the transaction should be associated with the loyalty account, despite the receipt data not matching or being unavailable. In another example, the stereo cameras 153 may have been unable to obtain an image of the user 101, but the receipt data provided sufficient matches to identify the user 101. In this example, the transaction should be associated with the loyalty account despite the missing image data. Any other rubric or decision making requirements may be utilized to determine how many matches or verifications are required to associate the transaction with the loyalty account.

In an example, the user verification device 150 provides the loyalty account data to the POS device 130 via the barcode scanner emulation. For example, may POS devices 130 are configured to accept loyalty user account data from barcode scanners. The user verification device 150 emulates this signal to allow the POS device 130 to accept the loyalty data without extensive programming or alterations.

When the transaction is associated with the loyalty account, the account management system 160 applies the loyalty benefits earned to the account of the user 101. For example, the amount of the transaction is logged in the loyalty account and the appropriate rewards points are applied to the account.

In another example, the transaction may not be a financial transaction. Instead the transaction may be a check in, such as to log an appearance at a gym. The transaction may be an access transaction, such as to allow access to a flight or access to a building. Similar methods may allow the system to verify the identify of a user 101 to allow the access.

Other Examples

FIG. 15 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to identify likely interactors approaching computing systems to perform an interaction, comprising:
    configuring, by one or more computing devices, a stereo camera near a point of interaction including one or more merchant computing devices;
    receiving, by one or more computing devices, one or more images captured by the stereo camera, the one or more images depicting a plurality of users;
    determining, by one or more computing devices, a respective distance from the point of interaction including the one or more merchant computing devices that each user of the plurality of users is located based on a triangulation of the one or more images;
    determining, by one or more computing devices, that a particular user of the plurality of users is in a position relative to the point of interaction to be a likely transacting user based on the respective distance of the particular user from the point of interaction;
    in response to determining that the particular user is a likely transacting user based on the particular user being in the position relative to the point of interaction, analyzing, by one or more computing devices, one or more motions made by the particular user of the plurality of users to determine if the one or more motions are indicative of a likely transacting user;
    determining, by one or more computing devices, that the particular user is a likely interacting user based on the particular user being in the position relative to the point of interaction and the one or more motions made by the particular user being indicative of a likely transacting user; and
    communicating, by one or more computing devices in response to determine that the particular user is the likely interacting user, a notification that the particular user is interacting.

2. The method of claim 1, wherein the one or more motions of the particular user comprise one or more of approaching the point of interaction, reaching for a wallet, or reaching across a counter.

3. The method of claim 1, further comprising:
    receiving, by one or more computing devices, a receipt from an interaction of the particular user;
    analyze, by one or more computing devices, the receipt to identify an account associated with the particular user; and
    communicate, by one or more computing devices, a notification to an issuer of the account associated with the particular user of the interaction, the notification comprising data from the interaction.

4. The method of claim 3, wherein the receipt is received from a communication sent to a receipt printer.

5. The method of claim 1, further comprising:
    logging, by one or more computing devices, a beginning time of an interaction;
    determining, by one or more computing devices, an appropriate time during the interaction to identify the particular user; and
    identifying at the appropriate time, by one or more computing devices, the particular user is likely interacting.

6. The method of claim 5, wherein determining an appropriate time comprises comparing a type of the interaction to a model of interactions of the type of the interaction to determine a time of the interaction in which an identification of the likely interacting user is most likely to be accurate.

7. The method of claim 1, further comprising:
    performing, by one or more computing devices, a facial recognition application on the particular user.

8. The method of claim 1, wherein the interaction is a financial transaction.

9. The method of claim 1, wherein the one or more computing devices are associated with a merchant computing system.

10. The method of claim 1, wherein the one or more computing devices operate on a point of sale terminal at a merchant location.

11. The method of claim 1, wherein the notification is communicated to a loyalty rewards system.

12. The method of claim 1, wherein determining the respective distance from the point of interaction that the particular user is located utilizes machine learning algorithms.

13. One or more non-transitory computer-readable media having computer-executable program instructions embodied thereon that when executed by a computer cause the computer to perform operations, the operations comprising:
    configuring a stereo camera near a point of interaction including one or more merchant computing devices;
    receiving one or more images captured by the stereo camera, the one or more images depicting a plurality of users;
    determining a respective distance from the point of interaction including the one or more merchant computing devices that each user of the plurality of users is located based on a triangulation of the one or more images;
    determining that a particular user of the plurality of users is in a position relative to the point of interaction to be a likely transacting user based on the respective distance of the particular user from the point of interaction;
    in response to determining that the particular user is a likely transacting user based on the particular user being in the position relative to the point of interaction, analyzing one or more motions made by the particular user of the plurality of users to determine if the one or more motions are indicative of a likely transacting user; and
    determining, by one or more computing devices, that the particular user is a likely interacting user based the particular user being in the position relative to the point of interaction and the one or more motions of the particular user being indicative of a likely transacting user.

14. The one or more non-transitory computer-readable media of claim 13, wherein the motions of the particular user comprise one or more of approaching the point of interaction, reaching for a wallet, or reaching across a counter.

15. The one or more non-transitory computer-readable media of claim 13, further comprising:
    computer-executable program instructions to compare the respective distance to a configured distance;
    computer-executable program instructions to determine based on comparing the respective distance that the particular user is likely interacting; and
    computer-executable program instructions to communicate a notification that the particular user is interacting.

16. The one or more non-transitory computer-readable media of claim 13, further comprising:
   computer-executable program instructions to perform a facial recognition application on the particular user.

17. A system to identify likely transactors approaching points of sale to ensure accurate transactions and to provide loyalty rewards, comprising:
   a processor communicatively coupled to a storage device and a network device, wherein the processor executes application code instructions that are stored in the storage device to cause the system to:
      configure a stereo camera near a point of interaction including one or more merchant computing devices;
      receive one or more images captured by the stereo camera, the one or more images depicting a plurality of users;
      log a beginning time of an interaction;
      determine an appropriate time during the interaction to identify a particular user of the plurality of users;
      determine a respective distance from the point of interaction including the one or more merchant computing devices that each user of the plurality of users is located based on a triangulation of the one or more images;
      determine that a particular user of the plurality of users is in a position relative to the point of interaction to be a likely transacting user based on the respective distance of the particular user from the point of interaction;
      in response to determining that the particular user is a likely transacting user based on the particular user being in the position relative to the point of interaction, analyze one or more motions made by the particular user of the plurality of users to determine if the one or more motions are indicative of a likely transacting user; and
      identify that the particular user is a likely interacting user based on the particular user being in the position relative to the point of interaction and the one or more motions of the particular user being indicative of a likely transacting user.

18. The system of claim 17, wherein the processor determines the appropriate time during the interaction to identify the particular user by comparing a type of the interaction to a model of interactions of the type of the interaction to determine a time of the interaction in which an identification of the likely interacting user is most likely to be accurate.

19. The system of claim 17, wherein the processor further executes application code instructions to cause the system to communicate a notification that the particular user is interacting.

* * * * *